United States Patent [19]
Naito et al.

[11] Patent Number: 5,557,552
[45] Date of Patent: Sep. 17, 1996

[54] SYSTEM FOR PROJECTING VEHICLE SPEED AND TIRE CONDITION MONITORING SYSTEM USING SAME

[75] Inventors: Toshiharu Naito, Okazaki; Masahiko Kamiya, Anio; Takeyasu Taguchi, Oobu; Kenji Fujiwara, Kariya, all of Japan

[73] Assignee: Nippondenso Co., Ltd., Aichi-pref., Japan

[21] Appl. No.: 216,536

[22] Filed: Mar. 23, 1994

[30] Foreign Application Priority Data

Mar. 24, 1993 [JP] Japan .................... 5-065549

[51] Int. Cl.⁶ .................. B60Q 1/00; E01C 23/00
[52] U.S. Cl. .......... 364/565; 364/424.03; 340/438; 340/441; 340/442; 340/444; 73/146; 73/514.39
[58] Field of Search ........................ 364/565, 558, 364/576, 426.02, 424.03; 340/438, 441, 442, 443, 444; 73/517 AV, 146, 146.4; 324/160; 307/10.1

[56] References Cited

U.S. PATENT DOCUMENTS

| | | | |
|---|---|---|---|
| 4,272,755 | 6/1981 | Broetto | 340/58 |
| 4,300,120 | 11/1981 | Surman | 340/58 |
| 4,355,297 | 10/1982 | Sinha et al. | 340/443 |
| 4,409,664 | 10/1983 | Skarvada | 364/565 |
| 4,574,267 | 3/1986 | Jones | 340/58 |
| 4,734,674 | 3/1988 | Thomas et al. | 340/58 |
| 4,777,611 | 10/1988 | Tashiro et al. | 364/565 |
| 4,866,982 | 9/1989 | Gault | 73/146.5 |
| 4,876,527 | 10/1989 | Oka et al. | 340/441 |
| 4,876,528 | 10/1989 | Walker et al. | 340/442 |
| 5,213,177 | 5/1993 | May | 180/197 |
| 5,231,391 | 7/1993 | Rigaux | 340/448 |
| 5,274,355 | 12/1993 | Galan | 340/445 |
| 5,301,130 | 4/1994 | Alcone et al. | 364/565 |

FOREIGN PATENT DOCUMENTS

| | | |
|---|---|---|
| 54-33772 | 3/1979 | Japan . |
| 57-117206 | 7/1982 | Japan . |
| 62-149503 | 7/1987 | Japan . |
| 62-149502 | 7/1987 | Japan . |

*Primary Examiner*—Emanuel T. Voeltz
*Assistant Examiner*—Patrick J. Assouad
*Attorney, Agent, or Firm*—Cushman Darby & Cushman

[57] ABSTRACT

An absolute vehicle speed determining system is provided. This system includes generally a first sensor for detecting an unsprung vibration frequency component acting on a front wheel and a second sensor for detecting an unsprung vibration frequency component acting on a rear wheel. A phase difference between the unsprung vibration frequency components is found to project an absolute speed of a vehicle based on the phase difference and a wheel base of the vehicle. In addition, a tire condition monitoring system is provided which is designed to monitor properties of the tire, for example, the inflation pressure, the type of tire, or the amount of tire wear using the absolute speed of the vehicle projected.

17 Claims, 24 Drawing Sheets

FROM STEP 120

↓

B·P·F

↓

TO STEP 130

|  | DYNAMIC LOADED TIRE RADIUS | | |
|---|---|---|---|
|  | DECREASE | NO CHANGE | INCREASE |
| UNSPRUNG RESONANCE FREQUENCY — INCREASE | c | c | a (c) |
| UNSPRUNG RESONANCE FREQUENCY — NO CHANGE | c | a | b |
| UNSPRUNG RESONANCE FREQUENCY — DECREASE | a (b) | b | b |

SYSTEM FOR PROJECTING VEHICLE SPEED AND TIRE CONDITION MONITORING SYSTEM USING SAME

BACKGROUND OF THE INVENTION

1. Technical Field of the Invention

The present invention relates generally to a vehicle speed projecting system and a tire condition monitoring system using same to measure properties of the tire, for example, the inflation pressure, the type of tire, or the amount of tire wear.

2. Background Art

There has been proposed various warning devices designed to measure a certain property of the tire. For example, an inflation pressure detecting system is well known in the art wherein the internal pressure of the tire is measured indirectly using wheel speed of each tire based on the fact that the tire radius is changed due to a drop in inflation pressure. In this prior art system, when a wheel speed of a specified wheel exceeds that of another wheel, the system concludes that the tire radius has been decreased due to the drop in inflation pressure.

The above prior art system, however, encounters a drawback in that since a variation in tire radius, or a drop in inflation pressure is measured by comparing wheel speeds with each other, it is difficult to maintain a desired measurement accuracy. For example, when the inflation pressure of only one wheel drops, the pressure drop is detected faithfully, however, when the inflation pressures of all tires are decreased gradually, this is difficult to detect.

In addition, when a studless snow tire is mounted on the vehicle in combination with normal tires or a tempa spare tire is attached to only one wheel, a similar problem is raised.

SUMMARY OF THE INVENTION

It is therefore a principal object of the present invention to avoid the disadvantages of the prior art.

It is another object of the present invention to provide a system for projecting an absolute vehicle speed with high accuracy.

It is a further object of the present invention to provide a tire condition monitoring system designed to measure properties of the tire such as the inflation pressure, the type of tire, or the amount of tire wear.

According to one aspect of the invention, there is provided a system for projecting an absolute speed of a vehicle which comprises a first detecting means for detecting an unsprung vibration frequency component acting on a front wheel to provide a signal indicative thereof, a second detecting means for detecting an unsprung vibration frequency component acting on a rear wheel to provide a signal indicative thereof, a phase difference determining means, responsive to the signals from the first and second detecting means, for determining a phase difference between the unsprung vibration frequency components acting on the front and rear wheels to provide a signal indicative thereof, and a vehicle speed projecting means, responsive to the signal from the phase difference determining means, for projecting the absolute speed of the vehicle based the phase difference and a wheel base of the vehicle.

In the preferred mode, the first detecting means detects a front wheel speed of the front wheel to provide a front wheel speed indicative signal including at least one of unsprung vertical and longitudinal resonance frequencies due to vibration inputs from a road surface. The second detecting means detects a rear wheel speed of the rear wheel to provide a rear wheel speed indicative signal including at least one of unsprung vertical and longitudinal resonance frequencies due to vibration inputs from the road surface. The phase difference determining means determines the phase difference in at least one of vertical and longitudinal resonance frequencies between the front wheel speed indicative signal and the rear wheel speed indicative signal.

According to another aspect of the invention, there is provided a system for monitoring tire conditions of a vehicle which comprises a first detecting means for detecting an unsprung vibration frequency component acting on a front wheel to provide a signal indicative thereof, a second detecting means for detecting an unsprung vibration frequency component acting on a rear wheel to provide a signal indicative thereof, a phase difference determining means, responsive to the signals from the first and second detecting means, for determining a phase difference between the unsprung vibration frequency components acting on the front and rear wheels to provide a signal indicative thereof, a vehicle speed projecting means, responsive to the signal from the phase difference determining means, for projecting an absolute speed of the vehicle based on the phase difference and a wheel base of the vehicle, a wheel speed determining means for determining a wheel speed, and a tire condition determining means for determining a change in tire radius during traveling based on the wheel speed determined by the wheel speed determining means and the absolute speed of the vehicle projected by the vehicle speed projecting means to determine a preselected tire condition.

In the preferred mode, the tire condition determining means determines a dynamic loaded tire radius based on the wheel speed determined by the wheel speed determining means and the absolute speed of the vehicle projected by the vehicle speed projecting means to measure a tire inflation pressure in a preselected relation to the dynamic loaded tire radius.

In addition, unsprung resonance frequency determining means for determining an unsprung resonance frequency of each wheel may be provided. The tire condition determining means determines a first tire inflation pressure based on the wheel speed determined by the wheel speed determining means and the absolute speed of the vehicle projected by the vehicle speed projecting means and a second tire inflation pressure based on the unsprung resonance frequency determined by the unsprung resonance frequency determining means. The tire condition determining means concludes that there is a change in tire inflation pressure when a difference between the first and second tire inflation pressures is less than a given value and at least one of the first and second tire inflation pressure is smaller than a given threshold value.

Further, the tire condition determining means may conclude that there is the change in tire inflation pressure based on the first tire inflation pressure when the wheel speed determined by the wheel speed determining means lies out of a given range and based on the second tire inflation pressure when the wheel speed falls within the given range.

The vehicle speed projecting means projects first and second absolute speeds of the vehicle based on the phase differences between right front and rear wheels and left front and rear wheels and the wheel base of the vehicle. When a difference between the first and second absolute speeds is less than a given value, the tire condition determining means concludes that there is the change in tire inflation pressure.

Additionally, the tire condition determining means concludes that there is the change in tire inflation pressure based on the second tire inflation pressure when the wheel speed falls within the given range and a variation in the wheel speed is greater than a preselected value.

According to a further aspect of the invention, there is provided a system for monitoring tire conditions of a vehicle which comprises a first detecting means for detecting an unsprung vibration frequency component acting on a front wheel to provide a signal indicative thereof, a second detecting means for detecting an unsprung vibration frequency component acting on a rear wheel to provide a signal indicative thereof, a phase difference determining means, responsive to the signals from the first and second detecting means, for determining a phase difference between the unsprung vibration frequency components acting on the front and rear wheels to provide a signal indicative thereof, a vehicle speed projecting means, responsive to the signal from the phase difference determining means, for projecting an absolute speed of the vehicle based on the phase difference and a wheel base of the vehicle, a wheel speed determining means for determining a wheel speed, an unsprung resonance frequency determining means for determining an unsprung resonance frequency, and a tire condition determining means for determining a dynamic loaded tire radius based on the wheel speed determined by the wheel speed determining means and the absolute speed of the vehicle projected by the vehicle speed projecting means, the tire condition determining means determining a type of tire in a preselected relation to the dynamic loaded tire radius and the unsprung resonance frequency.

According to a still further aspect of the invention, there is provided a system for monitoring tire conditions of a vehicle which comprises a first detecting means for detecting an unsprung vibration frequency component acting on a front wheel to provide a signal indicative thereof, a second detecting means for detecting an unsprung vibration frequency component acting on a rear wheel to provide a signal indicative thereof, a phase difference determining means, responsive to the signals from the first and second detecting means, for determining a phase difference between the unsprung vibration frequency components acting on the front and rear wheels to provide a signal indicative thereof, a vehicle speed projecting means, responsive to the signal from the phase difference determining means, for projecting an absolute speed of the vehicle based on the phase difference and a wheel base of the vehicle, a wheel speed determining means for determining a wheel speed, an unsprung resonance frequency determining means for determining an unsprung resonance frequency, and a tire condition determining means for determining a first dynamic loaded tire radius of a tire showing a preselected amount of tire wear based on the unsprung resonance frequency and a second dynamic loaded tire radius based on the wheel speed determined by the wheel speed determining means and the absolute speed of the vehicle projected by the vehicle speed projecting means, the tire condition determining means finding a difference between the first and second dynamic loaded tire radii to determine an amount of tire wear.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
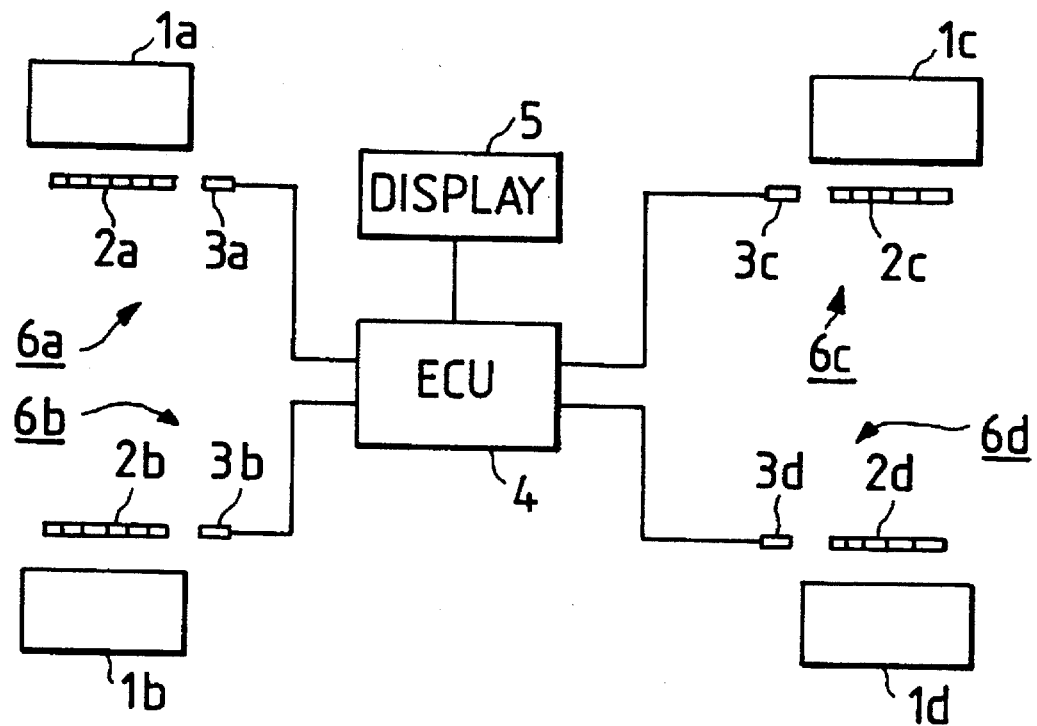
FIG. 1 is a schematic illustration which shows a vehicle speed projecting system according to the present invention.

Referring now to the drawings, wherein like numbers refer to like parts in several views, particularly to FIG. 1, there is shown a vehicle speed projecting system according to the present invention. The vehicle speed projecting system includes generally four wheel speed sensors 6a, 6b, 6c, and 6d provided one for each wheel with a tire 1a, 1b, 1c, and 1d, an electronic control unit (ECU) 4, and a display unit 5.

The wheel speed sensors 6a, 6b, 6c, and 6d include toothed wheels 2a, 2b, 2c, and 2d and pickup coils 3a, 3b, 3c and 3d, respectively. Each toothed wheel 2a, 2b, 2c, and 2d is made of a magnetic disc attached coaxially to a corresponding axle rotatably supporting the tire. Each pickup coil 3a, 3b, 3c, and 3d is arranged adjacent each toothed wheel 2a, 2b, 2c, and 2d with an interval therebetween to provide an alternating sensor signal having a frequency indicative of speed of each tire 1a, 1b, 1c, and 1d. The alternating sensor signal from each pickup coil is inputted to the ECU 4. The ECU 4 includes a waveform shaping circuit, a ROM, and a RAM, and performs signal processing such as the waveform shaping. The results of the signal processing is displayed on the display unit 5 to inform a driver of inflation pressures, types, and wear conditions of the tires 1a, 1b, 1c, and 1d.

The display unit 5 may indicate tire conditions (i.e., inflation pressure, type, and wear) of all the tires 1a, 1b, 1c, and 1d separately, and it may alternatively display same of either one of the tires.

Figure 2A:
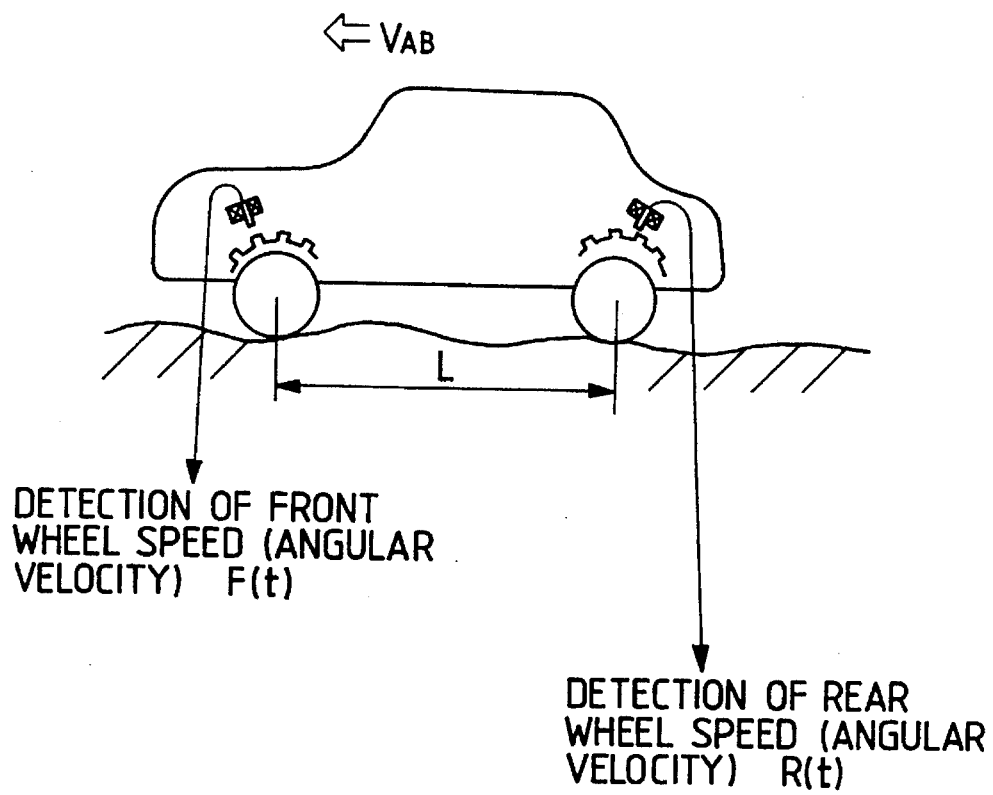
FIG. 2(a) is an explanatory view showing principles of determining an absolute vehicle speed based on a phase delay between front and rear wheel speed detection signals.
Figure 2B:
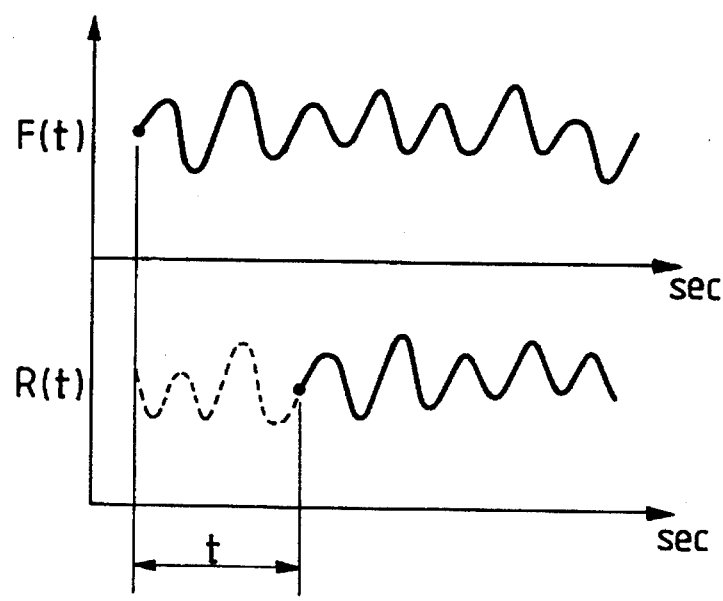
FIG. 2(b) is a graph which shows frequency characteristics of accelerations acting on front and rear wheels.

The principles of determining an absolute vehicle speed will be discussed below with reference to FIGS. 2(a) and 2(b).

Figure 3:
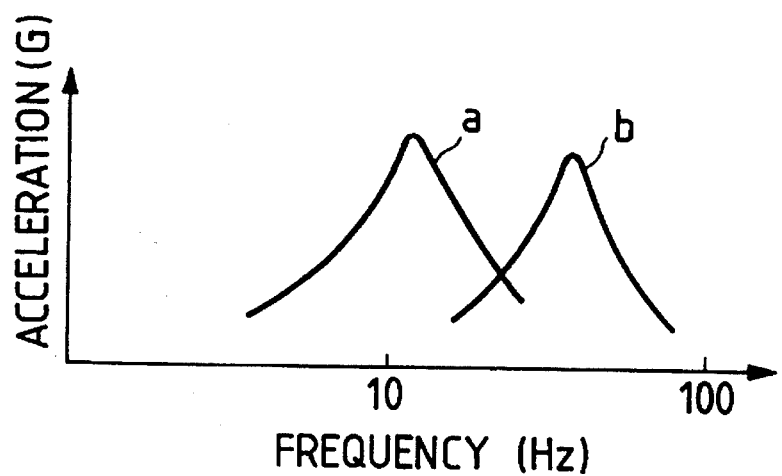
FIG. 3 is a graph which shows frequency characteristics of acceleration acting on an unsprung portion of a vehicle body.

When a vehicle is traveling on an asphalt-paved road surface, for example, tires may experience vertical and/or longitudinal vibrations due to small irregularities on the road surface. The frequencies of acceleration acting on a vehicle unsprung portion during the tire vibrations, vary, as shown in FIG. 3. As can be seen from FIG. 3, the acceleration frequencies of the vehicle unsprung portion have usually two peaks "a" and "b". The peak "a" indicates a maximum value of a vertical resonance frequency of the vehicle unsprung portion. The peak "b" indicates a maximum value of a longitudinal resonance frequency of the vehicle unsprung portion.

Figure 4:
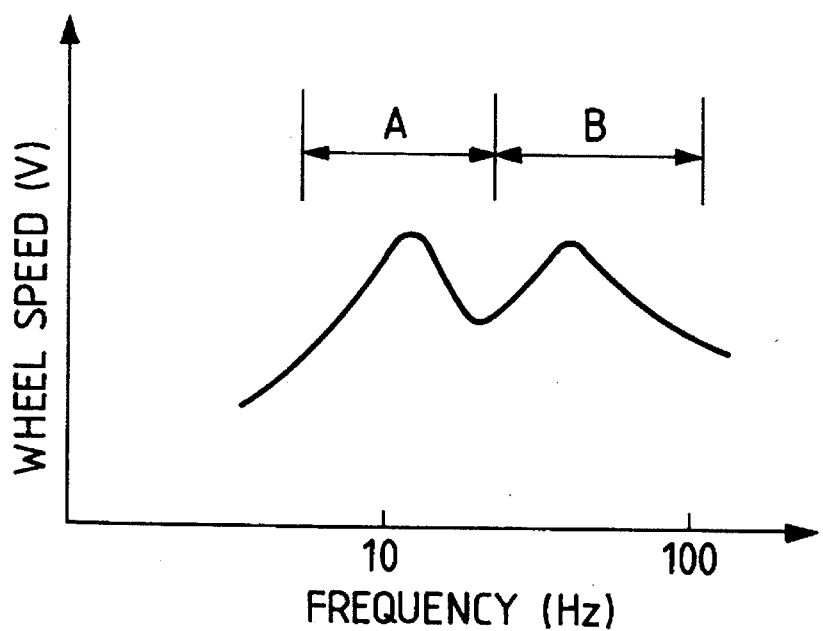
FIG. 4 is a graph which shows frequency characteristics of wheel speed.

Therefore, it is found that the alternating sensor signals outputted from the wheel speed sensors 6a to 6c represent the acceleration frequencies with two peaks, as shown in FIG. 4. For example, when the vehicle is, as shown in FIG. 2(a), running at an absolute vehicle speed $V_{AB}$, a front-wheel speed signal F(b) and a rear-wheel speed signal R(t), as shown in FIG. 2(b), include vibration components acting on the front and rear tires caused by road surface vibration inputs. It is seen that these vibration components appear remarkably when the vehicle passes over joints of bridges of a freeway, a manhole cover, repaired portions of an asphalt-proved road, or painted lines of a pedestrian crossing.

In general, when the vehicle is traveling straight, front and rear wheels may be considered to be under substantially the same road conditions. Thus, assuming that a phase delay, or phase difference between the front and rear wheels is defined as "τ" regardless of road conditions and tire wear, the relation of R(t)=F(t) −τ) is established between the front-wheel speed signal F(t) and the rear-wheel speed signal R(t).

Thus, the absolute vehicle speed $V_{AB}$ may be expressed below.

$$V_{AB} = L/\tau - \qquad (1)$$

where L is a wheel base of the vehicle.

It should be noted that the absolute vehicle speed $V_{AB}$ may be mathematically projected by finding the phase difference τ based on the front and rear wheel speed signals F(t) and R(t). It is desirable that the phase difference τ be determined by taking the Fourier transform of the front and rear wheel speed signals F(t) and R(t) and then developing the following correlation $R_{FR}$ between R(t) and F(t−τ), as quoted in the equation (1).

$$R_{FR}(t, t-\tau) = E[R(t).F(t-\tau)] - \qquad (2)$$

where E [ ] represents a total average.

Therefore, it will be appreciated that according to the above method of calculation, the absolute vehicle speed is measured using outputs from wheel speed sensors for use in, for example, an anti-lock brake system (ABS).

In addition, since the wheel base L may usually be manufactured and measured on the order of a millimeter, the use of the above method of calculation enables high-accuracy mathematical operation of the absolute vehicle speed.

Figure 5:
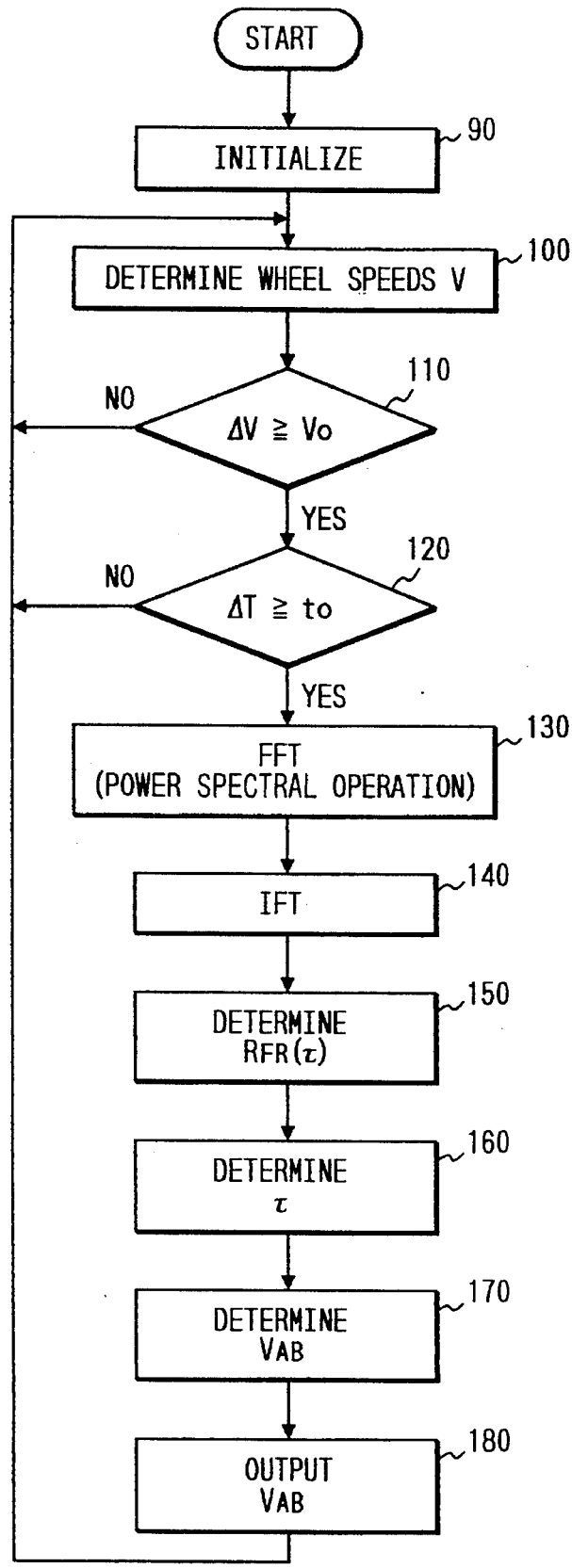
FIG. 5 is a flowchart which shows logical steps performed by a vehicle speed projecting system of the invention.

Referring to FIG. 5, there is shown a flowchart of a program or sequence of logical steps performed by the ECU 4 of the vehicle speed projecting system of the invention. While the ECU 4 performs the same program for all four tires 1a, 1b, 1c, and 1d, the following discussion will be referred to one side of front and rear tires for the sake of simplicity.

After entering the program, the routine proceeds to step 90 wherein the ECU 4 is initialized. The routine then proceeds to step 100 wherein front and rear wheel speeds V are determined by waveform-shaping the ac sensor signals F(t) and R(t) from the wheel speed sensors (6a and 6c or 6b and 6d) to produce pulse signals and then dividing an interval between pulses by a time period therebetween. The front and rear wheel speeds V (hereinafter, generally referred to as wheel speed V) each usually have different high-frequency components including a vibration frequency component of the tire.

Subsequently, the routine proceeds to step 110 wherein it is determined whether a variation ΔV of the wheel speed V exceeds a reference value $V_0$ or not. If a NO answer is obtained meaning that the variation ΔV is smaller the reference value $V_0$, then the routine returns back to step 100. Alternatively if a YES answer is obtained, the routine then proceeds to step 120 wherein it is determined whether a time period AT during which the variation ΔV is over the reference value $V_0$ exceeds a preselected period to or not. The above steps 110 and 120 are provided for determining whether a road surface on which a controlled vehicle is traveling is useful for calculating the absolute vehicle speed. It is because since the absolute vehicle speed is determined based on the vibration frequency component of the tire, it cannot be found if the wheel speed V do not vary over a certain degree.

In the determination in step 120, the moment the variation $\Delta V$ of the wheel speed V exceeds the reference value $V_0$, a preselected time interval $\Delta t$ is set, and when the variation $\Delta V$ of the wheel speed V exceeds the reference value $V_0$ again within the time interval $\Delta t$, the measurement of the time period $\Delta T$ is continued.

If a NO answer is obtained in step 120, the routine then returns back to step 100. Alternatively, if a YES answer is obtained, then the routine proceeds to step 130 wherein frequency components of the wheel speed V calculated in step 100 are analyzed by taking the fast Fourier transform (FFT), for example.

The routine then proceeds to step 140 wherein a correlation function $R_{FR}(\tau)$ is determined by taking the inverse Fourier transform. In step 150, the phase difference $\tau$ is determined based on the correlation function $R_{FR}(\tau)$. Subsequently, the routine proceeds to step 170 wherein the absolute vehicle speed $V_{AB}$ is determined according to the above equation (1). In step 180, a signal indicative of the absolute vehicle speed $V_{AB}$ is outputted.

The frequencies of the signal indicative of the wheel speed V, as employed in the fast Fourier transform in step 130 do not always need to include both vertical and longitudinal components of the unsprung vibrations, as shown in FIG. 4. It is advisable that after step 120, an additional step, as shown in FIG. 6, be provided to select either of a range A, as shown in FIG. 4, including the vertical component of the unsprung vibrations and a range B including the longitudinal component of the unsprung vibration or otherwise switch therebetween using a narrow-bandwidth filter, for example.

The determination of the absolute vehicle speed $V_{AB}$, as discussed in FIG. 5, based on the phase delay $\tau$ between the front and rear wheels, is made by taking the fast Fourier transform. This however, gives rise to a problems in that a great number of memory storages (e.g., RAM) and mathematical operations are required, resulting in an increased calculation load of the ECU 4. For addressing this problem, a simple means, as will be described below, may be provided.

Figures 6, 7:
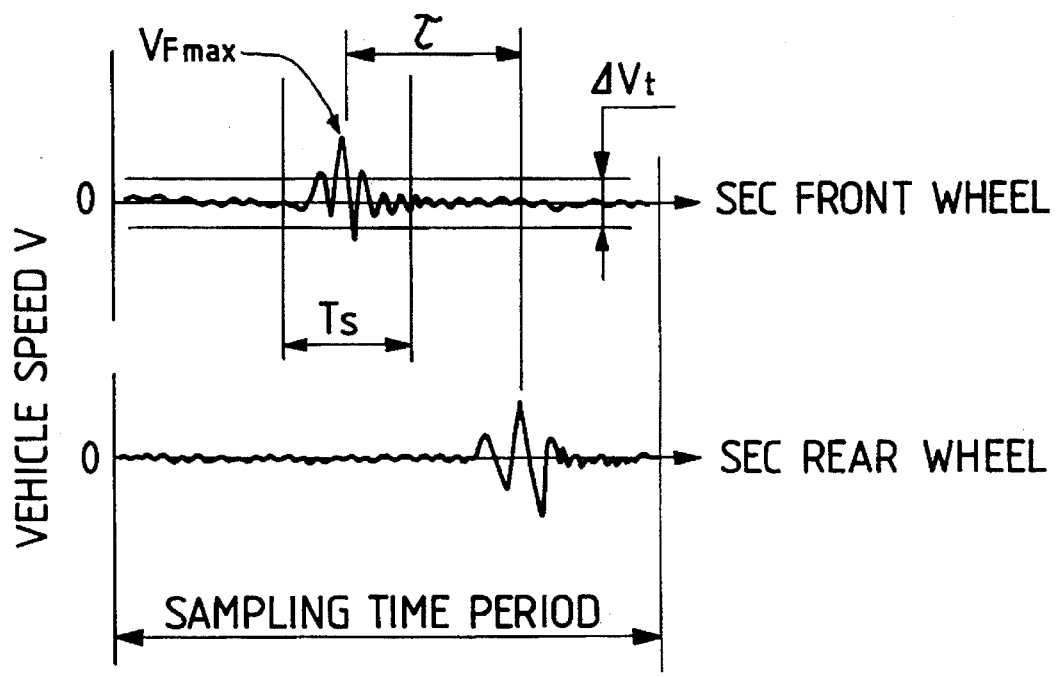
FIG. 6 is a flowchart which shows a modification of the vehicle speed projecting system, as shown in FIG. 5.
FIG. 7 is a graph which shows wheel speeds of front and rear wheels.

FIG. 7 shows typical patterns of vibrations generated on the unsprung portions (i.e., front and rear wheels) of a vehicle when passing over joints of bridges of a freeway, a manhole cover, repaired portions of an asphalt-proved road, or painted lines of a pedestrian crossing. These vibrations are detectable by the wheel speed sensors, as shown in FIG. 1.

Assuming that the vehicle is traveling straight, the phase difference $\tau$ between the front and rear wheels may be measured by comparing distinctive waveforms appearing on signals detected.

Figure 8:
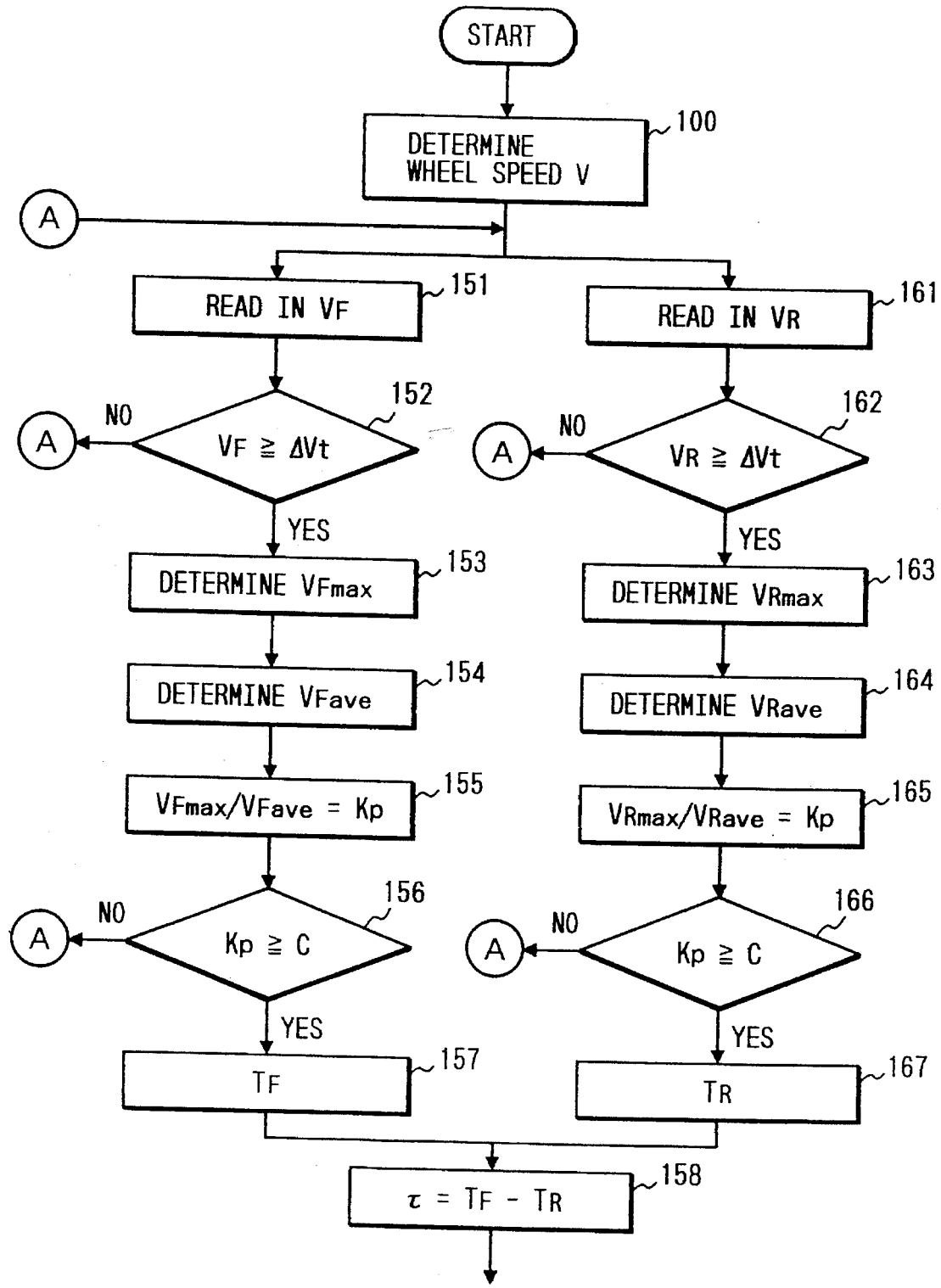
FIG. 8 is a flowchart which shows logical steps performed by an alternative embodiment of a vehicle speed projecting system of the invention.

FIG. 8 shows a modification of the above embodiment. The shown program is carried out with respect to the front and rear wheels, respectively. The following discussion will however, be made on only a front wheel for the sake of brevity. Steps 151 to 157 represent processing of the front wheel speed signal F(t), while steps 161 to 167 show processing of the rear wheel speed signal R(t).

In step 100, the wheel speed V is determined in the same manner as described in FIG. 5. The routine then proceeds to step 151 wherein the front wheel speed $V_F$ is read in the RAM of the ECU 4 for a preselected sapling time period. In step 152, it is determined whether the front wheel speed $V_F$ is greater than a preselected wheel speed variation $\Delta Vt$ or not. This determination is provided for initially selecting desired data based on the magnitude of inputs as a relatively great vibration is inputted when the vehicle travels over a protrusion on a road surface. If a NO answer is obtained concluding that the front wheel speed $V_F$ is smaller than the preselected wheel speed variation $\Delta Vt$, then the routine returns back to step 151. Alternatively, if a YES answer is obtained, the routine then proceeds to step 153 wherein the front wheel speed $V_F$ is searched for a peak to determine a maximum front wheel speed $V_{Fmax}$. Subsequently, the routine proceeds to step 154 wherein a wheel speed average value $V_{Fave}$ is determined over a duration within the sampling time other than a time frame Ts in which the time the maximum front wheel speed $V_{Fmax}$ is detected is defined as the center. The routine then proceeds to step 155 wherein a ratio Kp of the maximum front wheel speed $V_{Fmax}$ to the wheel speed average value $V_{Fave}$ is determined. The routine then proceeds to step 156 wherein it is determined whether the ratio Kp is greater than or equal to a preselected value C or not. If a NO answer is obtained concluding that the ratio Kp is smaller than the value C, then the routine returns back to step 151. Alternatively, if a YES answer is obtained, the routine then proceeds to step 157 wherein a time $T_F$ the maximum front wheel speed $V_{Fmax}$ is detected, is stored in the memory.

In the same manner, as described above, a time $T_R$ a maximum rear wheel speed $V_{Rmax}$ is detected, is determined in step 167. The routine proceeds to step 158 wherein the phase difference $\tau$ is determined by subtracting the time $T_R$ from the time $T_F$. Afterwards, the routine proceeds to step 170, as shown in FIG. 5.

The above processing of finding the phase difference $\tau$ based on the vibration components of the front and rear wheel speeds $V_F$ and $V_R$ is carried out under the assumption that the vehicle is traveling straight. Therefore, the above processing is preferably initiated when preselected conditions indicative of straight running such as a difference in speed between the front and rear wheels smaller than a given value or a steered angle less than a predetermined value, are met.

Additionally, in place of the vibration components of the front and rear wheel speeds, the absolute vehicle speed may alternatively be determined based on a change in angle, angular velocity, or angular acceleration of the wheel.

Figure 9:
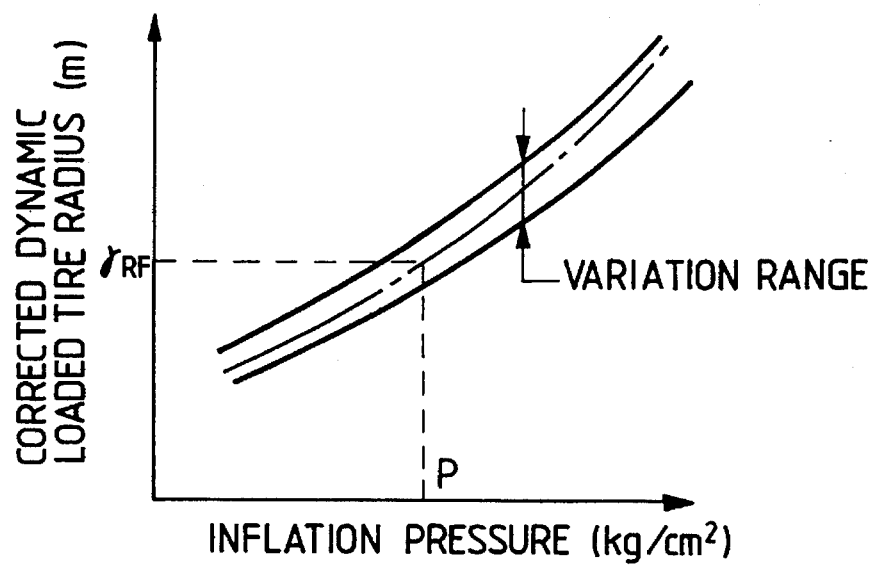
FIG. 9 is a graph which shows a relation between a corrected dynamic loaded tire radius and a tire inflation pressure.

A tire condition monitoring system using the vehicle speed projecting system, as mentioned above, according to the invention will be discussed below. The tire condition monitoring system is designed to mathematically project a dynamic loaded radius of each tire indicative of a tire radius during rotations based on the absolute vehicle speed $V_{AB}$ to determine the tire inflation pressure by look-up using mapped data, as shown in FIG. 9.

Figure 10:
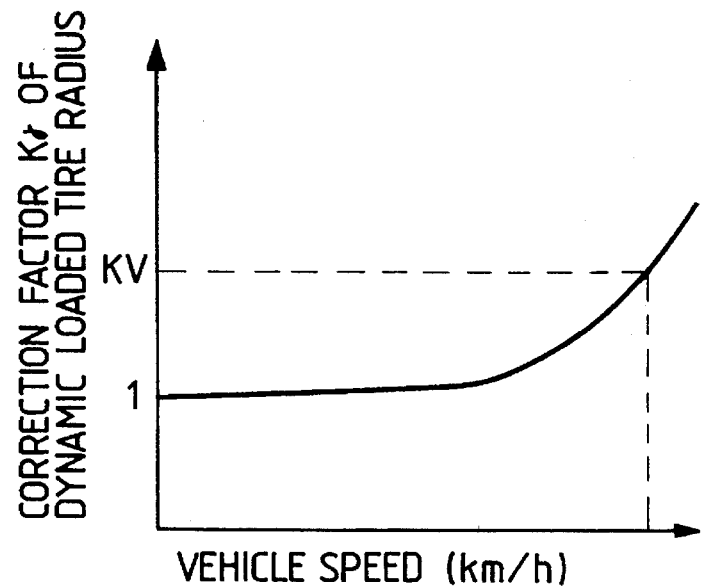
FIG. 10 is a graph which shows a relation between a correction factor of dynamic loaded tire radius and vehicle speed.

Usually, the dynamic loaded tire radius during traveling depends upon a load acting on the tire, tire wear, and vehicle speed as well as tire inflation pressure. Accordingly, in the relation between the dynamic loaded tire radius and the tire inflation pressure of FIG. 9, a variation range is provided based on the fact that the dynamic loaded tire radius is subject to changes in the load exerted on the tire and the tire wear. FIG. 10 shows a map for determining a correction factor Kv of the dynamic loaded tire radius based on the vehicle speed.

Figure 11:
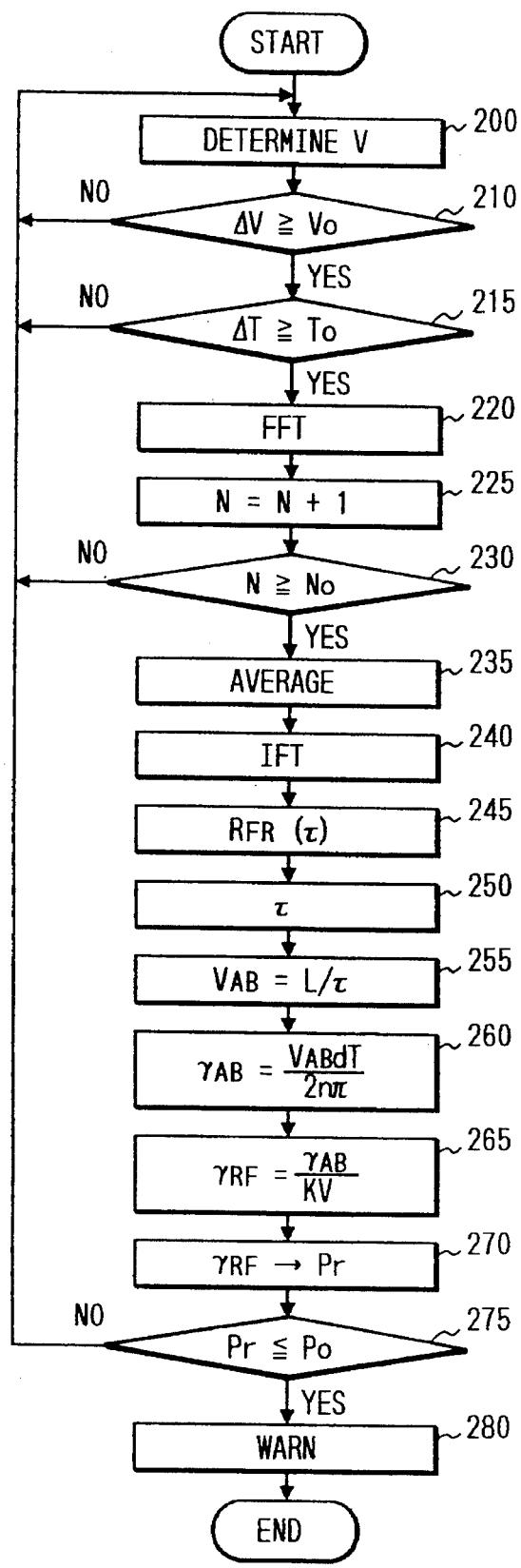
FIG. 11 is a flowchart which shows logical steps performed by a tire condition monitoring system according to the present invention.

Referring to FIG. 11, there is shown, a flowchart of a program carried out by the tire condition monitoring system. This program is performed for each tire. Steps 200 to 220 are the same as steps 100 to 130, as shown in FIG. 5, and explanation thereof in detail will be omitted here.

After the fast Fourier transform (FFT) of frequency components of the wheel speed V is taken in step 220, the routine proceeds to step 225 wherein the number of operations of the FFT N is counted (N=N+1). The routine proceeds to step 230 wherein it is determined whether the number of operations of the FFT N has reached a preselected count value No or not. If a No answer is obtained, the routine then returns back to step 200. Alternatively, if a YES answer is obtained, then routine proceeds to step 235 wherein the FFT operation results of No times are averaged. In step 240, the correlation function $R_{FR}(\tau)$ between the front and rear wheels is determined by taking the Inverse Fourier transform (IFT). In step 250, the phase difference $\tau$ is derived based on the correlation function $R_{FR}(\tau)$. Steps 225 and 230 are provided for reducing unwanted noise included in the frequency components of the wheel speed V, however, they may alternatively be omitted dependent upon road surface conditions and/or vehicle speed.

Subsequently, in step 255, the absolute vehicle speed $V_{AB}$ is calculated by dividing the wheel base L by the phase difference $\tau$. The routine then proceeds to step 260 wherein a dynamic loaded tire radius $r_{AB}$ is mathematically projected based on the number of pulses (n) provided, within a given period of time (dt), in proportion to the wheel speed V determined and the absolute vehicle speed $V_{AB}$ according to the relation of $V_{AB}dt/2n\pi$). The routine then proceeds to step 265 wherein the correction factor Kv of the dynamic loaded tire radius $r_{AB}$ is determined based on the absolute vehicle speed $V_{AB}$ by looking up the map, as shown in FIG. 10, and a corrected dynamic loaded tire radius $r_{RF}$ is determined according to the relation of $(r_{AB}/Kv)$.

Subsequently, in step 270, a tire inflation pressure Pr is determined based on the corrected dynamic loaded tire radius $r_{RF}$ by looking up the map, as shown in FIG. 9. The routine then proceeds to step 275 wherein it is determined whether the tire inflation pressure Pr is smaller than or equal to a given allowable lower limit Po is not. If a NO answer is obtained concluding that the tire inflation pressure Pr is greater than the given allowable lower limit Po, then the routine returns back to step 200. Alternatively, if a YES answer is obtained, the routine then proceeds to step 280 wherein an alarm is raised through the display unit 5 to indicate that the tire is partially or completely deflated.

Figure 12:
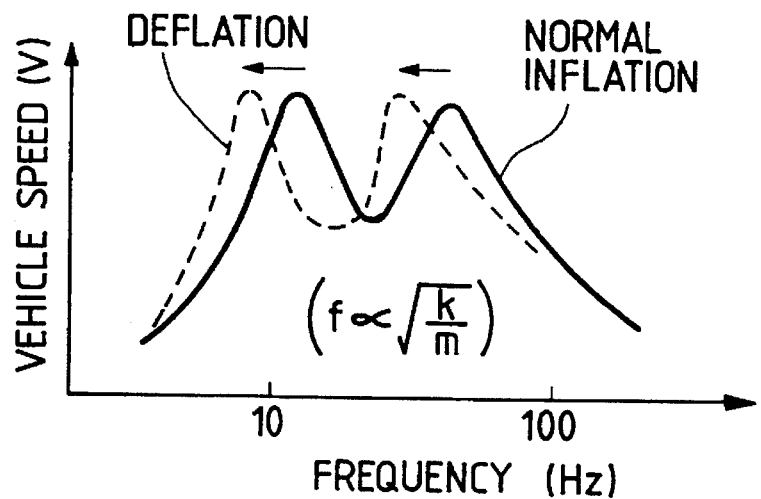
FIG. 12 is a graph which shows a variation in unsprung resonance frequency due to a drop in tire inflation pressure.
Figure 14:
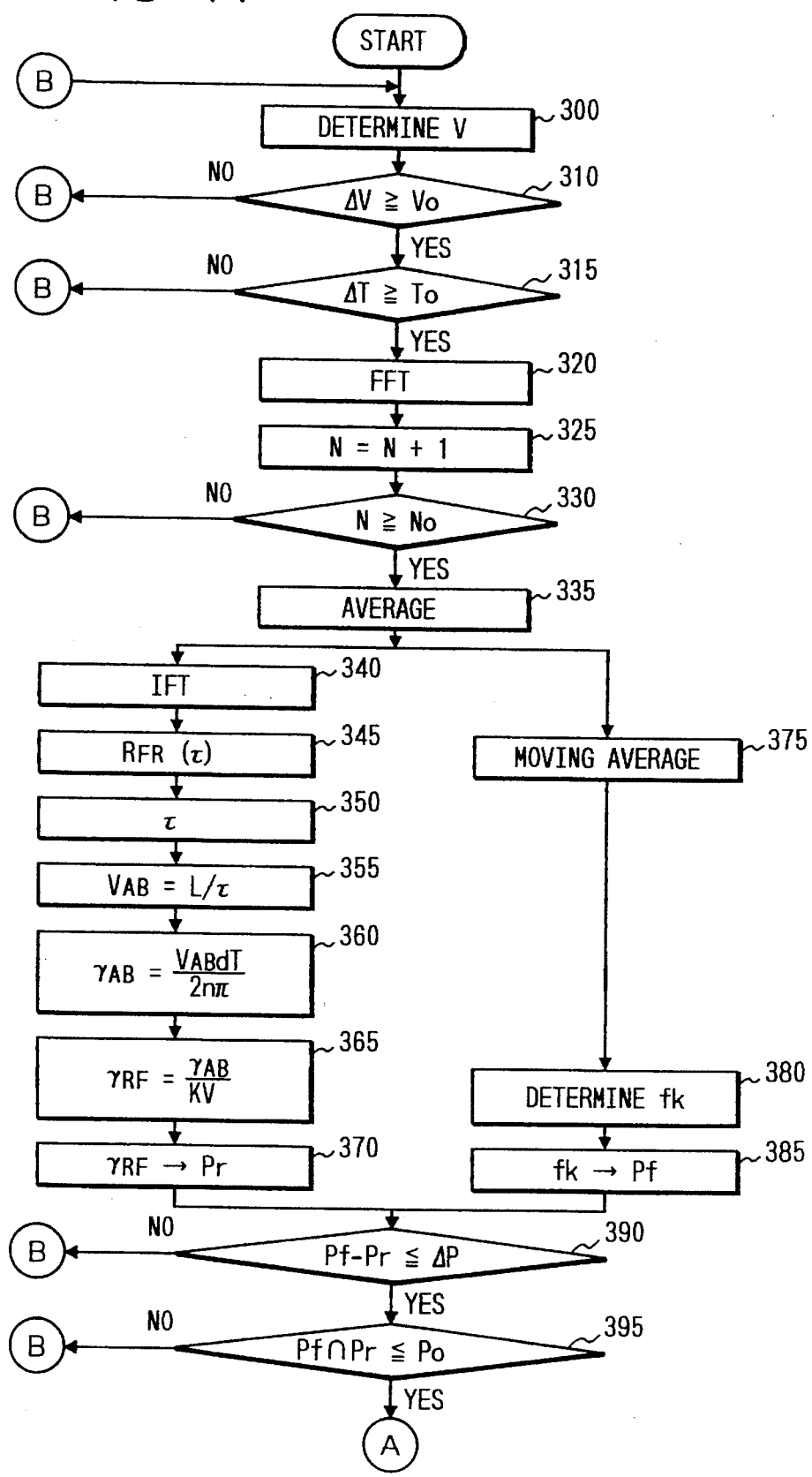
FIGS. 14 and 15 show a flowchart according to a second embodiment of a tire condition monitoring system of the invention.

FIG. 14 shows a second embodiment of the tire condition monitoring system. The unsprung resonance frequency, as already discussed in FIGS. 3 and 4, is detectable based on the wheel speed signal of each wheel, and has vertical and longitudinal resonance points. The vertical and longitudinal resonance points both are, as shown in FIG. 12, shifted as the tire inflation pressure drops. Therefore, it will be appreciated that the amount of inflation of each tire may be measured by detecting a change in at least one of the vertical and longitudinal resonance points.

The tire condition monitoring system of this embodiment is designed to monitor a tire inflation pressure Pf based on the change in the resonance point of the unsprung resonance frequency and the tire inflation pressure Pr based on the dynamic loaded tire radius, as referred to in the above embodiment. When a difference between the tire inflation pressures Pf and Pr is lower than a given threshold value ΔP and when the tire inflation pressures Pf and Pr are decreased below an allowable lower limit Po, an alarm is raised to a driver.

Figure 15:
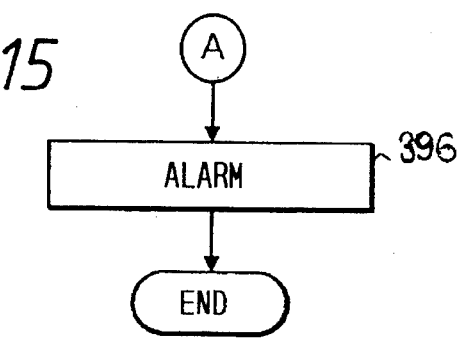

FIGS. 14 and 15 show a flowchart of a program according to the second embodiment of the tire condition monitoring system. This program is performed for each tire. Steps 300 to 370 are the same as steps 200 to 270, as shown in FIG. 11, and explanation thereof in detail will be omitted here.

Figure 13:
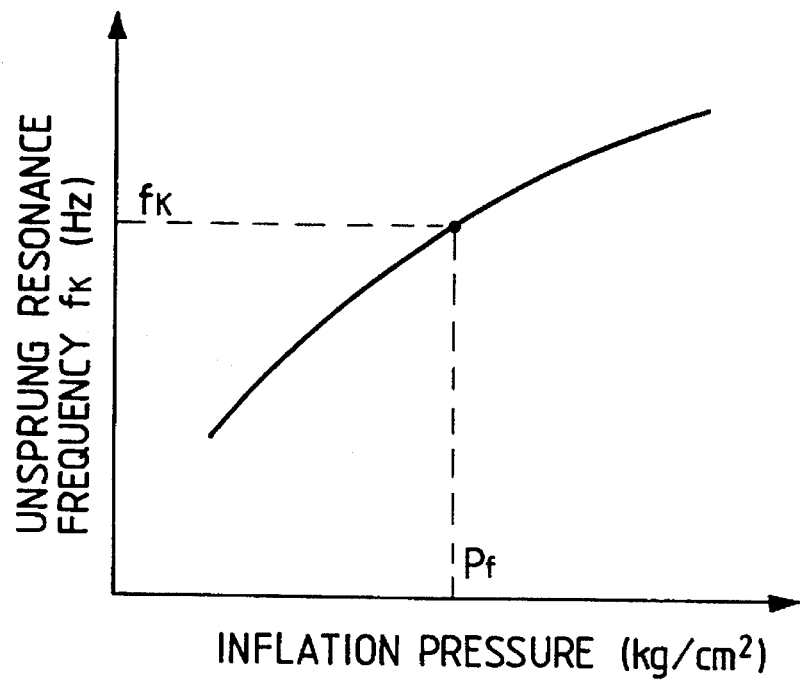
FIG. 13 is a graph which shows a relation between an unsprung resonance frequency and a tire inflation pressure.

In step 375, for further improving the averaging of the FFT operation results in step 335, the moving average is performed to make the resonance point more clear. In step 380, a resonance frequency fk at either of the vertical and longitudinal resonance points of the unsprung portion is detected. In step 385, the tire inflation pressure Pf is determined based on the resonance frequency fk by look-up using a mapped data, as shown in FIG. 13.

Subsequently, the routine proceeds to step 390 wherein a difference (Pf−Pr) between the tire inflation pressures Pr derived in step 370 and the tire inflation pressure Pf determined in step 385, is found, and determination is made whether the difference (Pf −Pr) is smaller than a given threshold value ΔP or not. If a YES answer is obtained, then the routine proceeds to step 395 wherein it is determined if both the tire inflation pressures Pf and Pr are less than an allowable lower limit Po. If a YES answer is obtained, the routine then proceeds to step 396 wherein an alarm is raised to the driver through the display unit 5 to indicate that the tire is partially or completely deflated. With this arrangement, the tire inflation pressure is measured with higher accuracy than the above embodiment.

Figure 16:
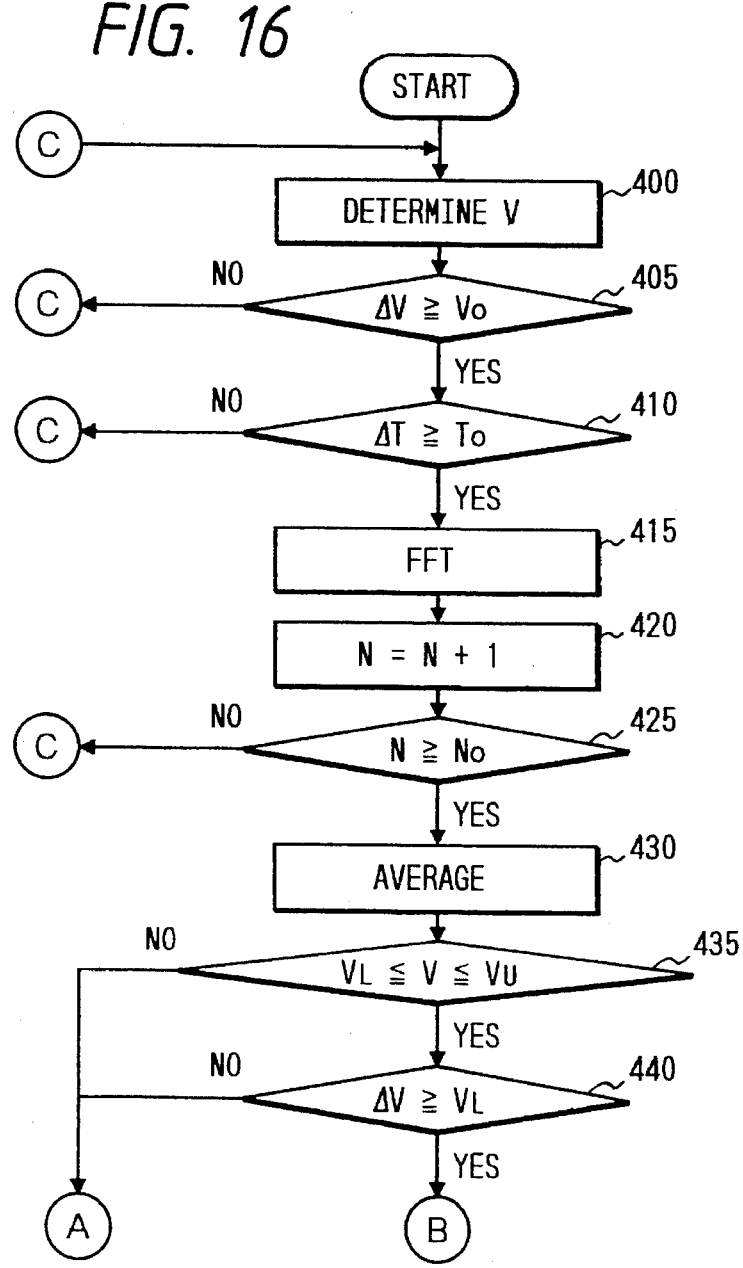
FIGS. 16 and 17 show a flowchart according to a third embodiment of a tire condition monitoring system of the invention.
Figure 17:
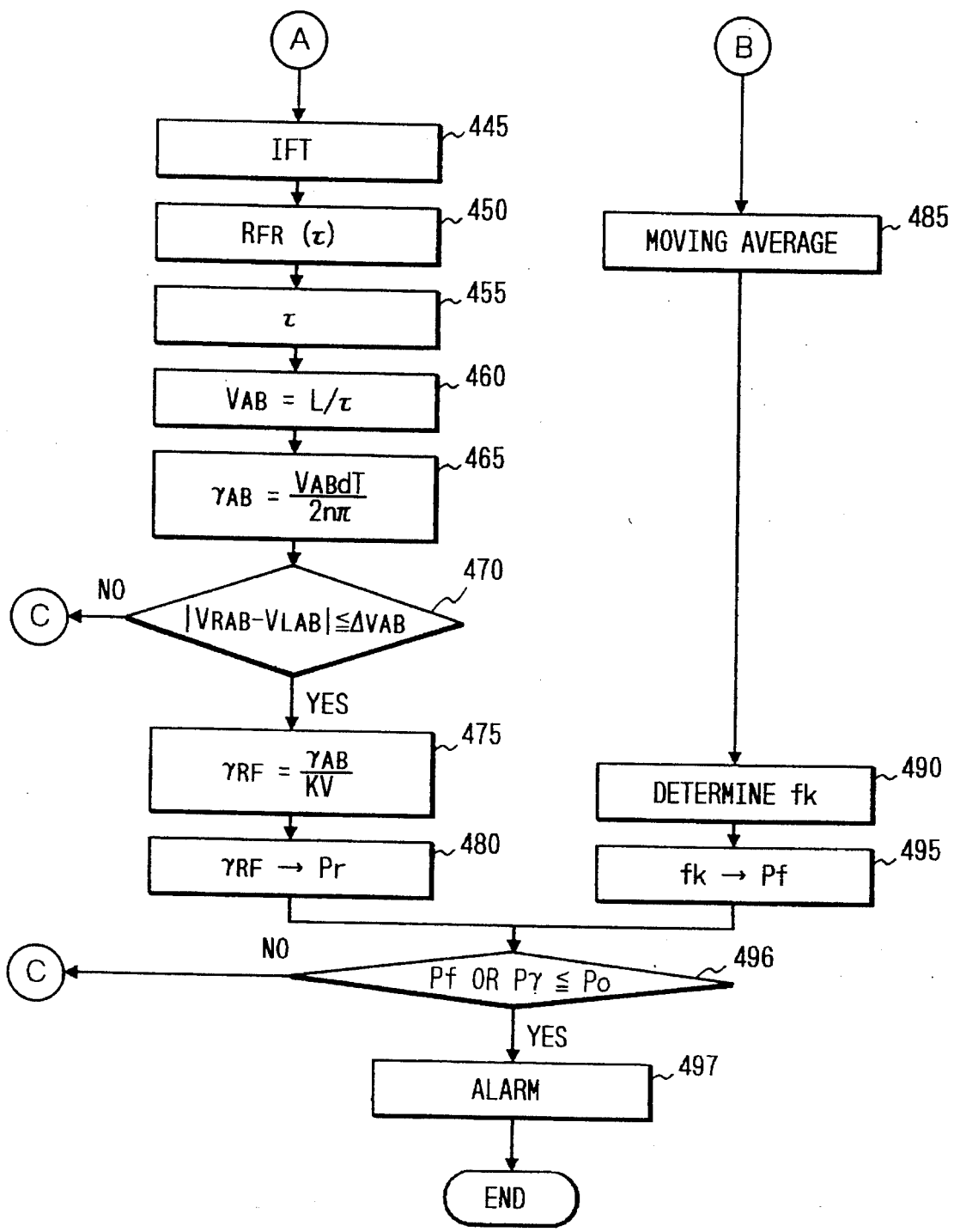

FIGS. 16 and 17 shows a third embodiment of the tire condition monitoring system. The shown program is performed for each tire. Steps 400 to 430 are the same as steps 300 to 335, as shown in FIG. 14, and explanation thereof in detail will be omitted here.

After step 430, the routine proceeds to step 435 wherein it is determined whether the vehicle speed V determined falls in a range from a lower limit $V_L$ (e.g., 10 km/h) to an upper limit $V_U$ (e.g., 150 km/h) or not. If a YES answer is obtained, then the routine proceeds to step 440 wherein it is determined if the variation ΔV in the vehicle speed V determined in step 400 is greater than a predetermined value $V_L$ which is more than the reference value $V_O$ in step 405. If a YES answer is obtained, the routine then proceeds to step 485.

As mentioned above, the determination of the tire inflation pressure using the resonance frequency fk of the unsprung portion is based on the magnitude of frequency components within a specified frequency range of vibrations acting on the unsprung portion. The unsprung vibrations usually become reduced when the vehicle speed is extremely low, therefore, a drawback is encountered in that the measurement accuracy of the tire inflation pressure is degraded. In addition, there is almost no unsprung vibration when the vehicle speed is high (e.g., more than 150 km/h). This leads to a drawback in that it is difficult to monitor the tire inflation pressure. Further, when the vehicle is traveling on an icy road surface, the smoothness of the road surface restricts the unsprung vibrations from generating, making it more difficult to determine the tire inflation pressure.

Therefore, in this embodiment, if a NO answer is obtained in step 435 or 440, that is, the vehicle speed V lies out of the range from the lower limit $V_L$ to the upper limit $V_U$ and the vehicle is traveling on an even road surface causing little vibration input, the tire inflation pressure is determined using the dynamic loaded tire radius $r_{AB}$ calculated based on the absolute vehicle speed $V_{AB}$ according to steps 445 to 480.

If a YES answer is obtained in step 440 concluding that the variation ΔV in the vehicle speed V is greater than the predetermined value $V_L$, then the routine proceeds to step 485. Steps 485 to 495 are the same as steps 375 to 385, as shown in FIG. 14, and explanation thereof will be omitted here.

Similarly, steps 445 to 480 are substantially the same as steps 340 to 370, as shown in FIG. 14, except step 470.

In step 470, a difference between an absolute vehicle speed $V_{RAB}$ determined based on the phase difference $\tau$ between the right front and rear wheels and an absolute vehicle speed $V_{LAB}$ derived based on the phase difference $\tau$ between the left front and rear wheels, is determined and determination is made whether the difference $|V_{RAB}-V_{LAB}|$ is smaller than a given value $\Delta V_{AB}$ or not. If a YES answer is obtained meaning that the vehicle is traveling straight, then the routine proceeds to step 475.

After both the tire inflation pressures Pf and Pr are determined in steps 480 and 495, the routine proceeds to step 496 wherein it is determined if either of the tire inflation pressures Pf and Pr is less than the allowable lower limit Po. If a YES answer is obtained, the routine then proceeds to step 497 wherein an alarm is raised to the driver through the display unit 5 to indicate that the tire is partially or completely deflated.

A fourth embodiment of the tire condition monitoring system will be described below.

The above second and third embodiment of the tire condition monitoring system using the unsprung resonance frequency fk provide the advantage that the tire inflation pressure is determined accurately, however, do not take into consideration the tire change, thereby giving rise to a problem in that since the allowable lower limit $P_O$ for determining the amount of deflation of the tire is set to a fixed value, the tire inflation pressure may not be determined accurately when a tire is changed with another tire. Accordingly, the fourth embodiment of the tire condition monitoring system is designed to eliminate this problem.

Figure 18:
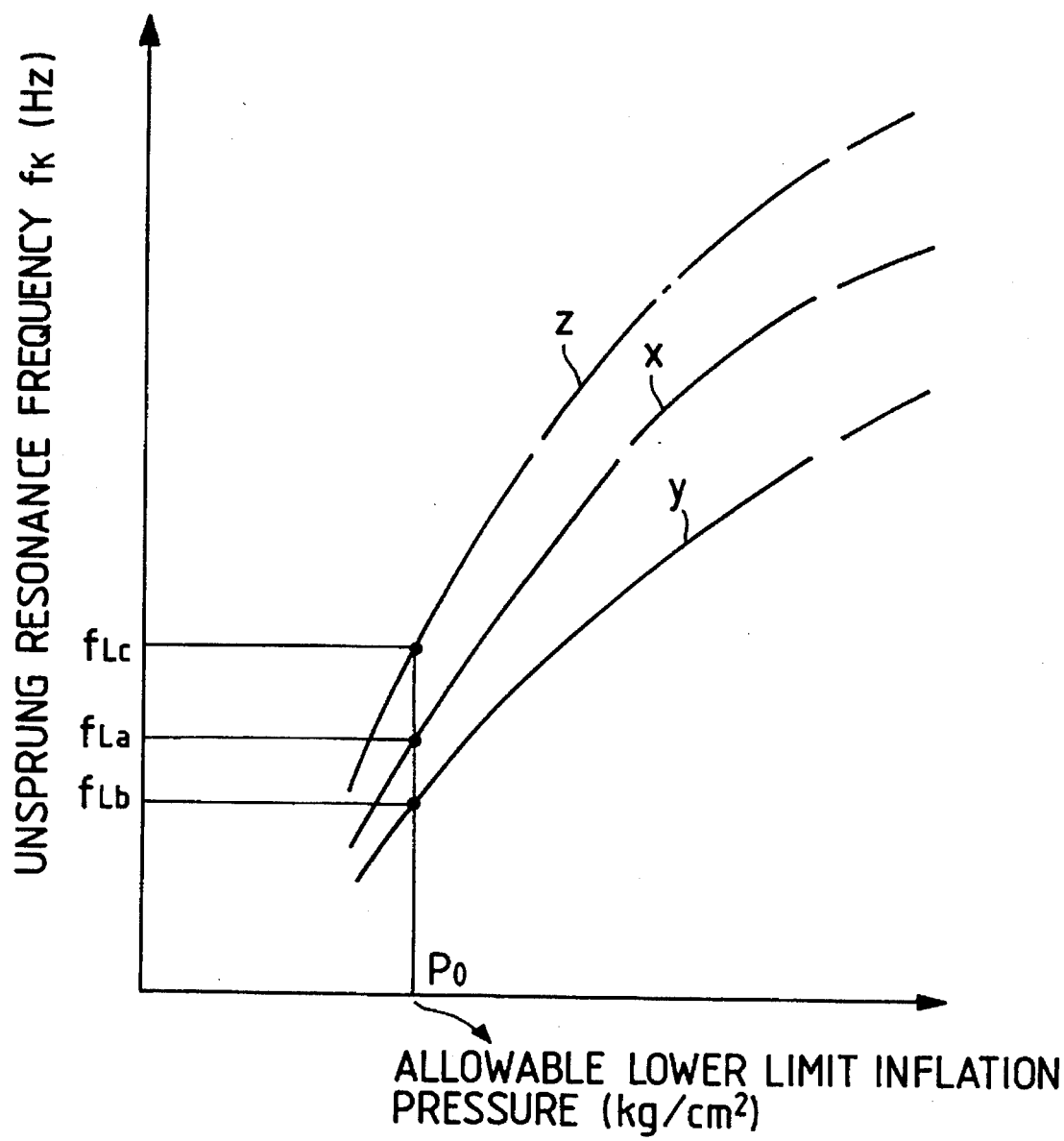
FIG. 18 is a graph which shows relations between an unsprung resonance frequency and a tire inflation pressure according to the type of a tire mounted on a vehicle.
Figure 19:
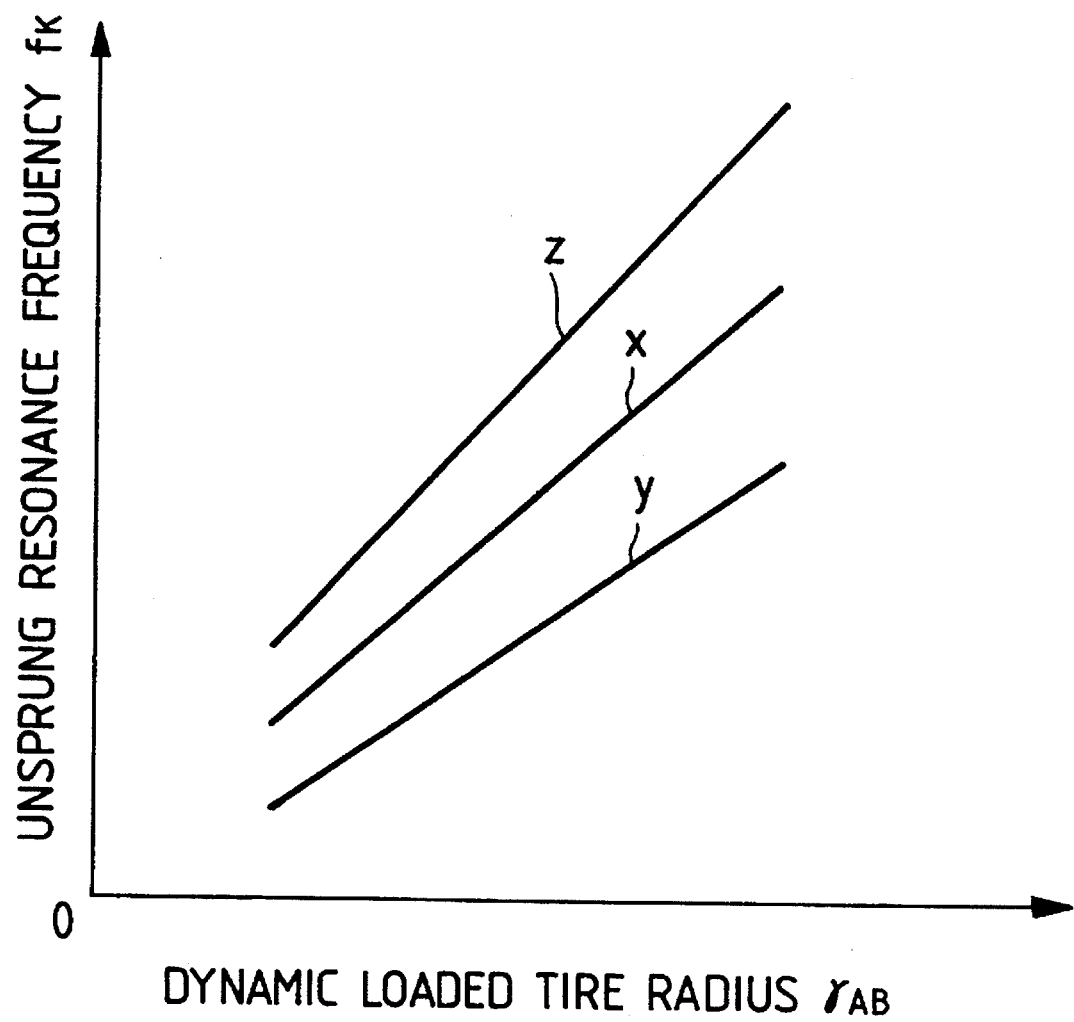
FIG. 19 is a graph which shows relations between an unsprung resonance frequency and a dynamic loaded tire radius according to the type of a tire mounted on a vehicle.

Usually, a change in the unsprung resonance frequency is almost caused by a change in spring constant due to the variation in tire inflation pressure. The tire inflation pressure may thus be measured uniformly without the influence of another cause such as tire wear, for example. Therefore, the tire inflation pressure may be measured with high accuracy by detecting the change in the unsprung resonance frequency in either the vertical or longitudinal direction. This measurement is, however, performed on the assumption that the same type of tires are mounted on the vehicle. In general, a regular tire inflation pressure, as shown in FIG. 18, is different according to the type of tire although the unsprung resonance frequencies are the same. Accordingly, in the fourth embodiment of the tire condition monitoring system, a reference value for determining the amount of tire deflation is changed according to the type of tire such as a radial tire, a studless snow tire, or a lower aspect ratio tire. In FIGS. 18 and 19, a line Z indicates the relation between the unsprung resonance frequency and the allowable lower limit $P_O$ of a normal radial tire, a line Y indicates the relation between the unsprung resonance frequency and the allowable lower limit $P_O$ of a studless snow tire, and a line X represents the relation between the relation between the unsprung resonance frequency and the allowable lower limit $P_O$ of a lower aspect ratio tire.

The type of tire is determined using the dynamic loaded tire radius $r_{AB}$ and the unsprung resonance frequency fk. The resonance frequency fk is, as shown in FIG. 19, directly proportional to the dynamic loaded tire radius $r_{AB}$ according to the type of tire.

Figure 20:
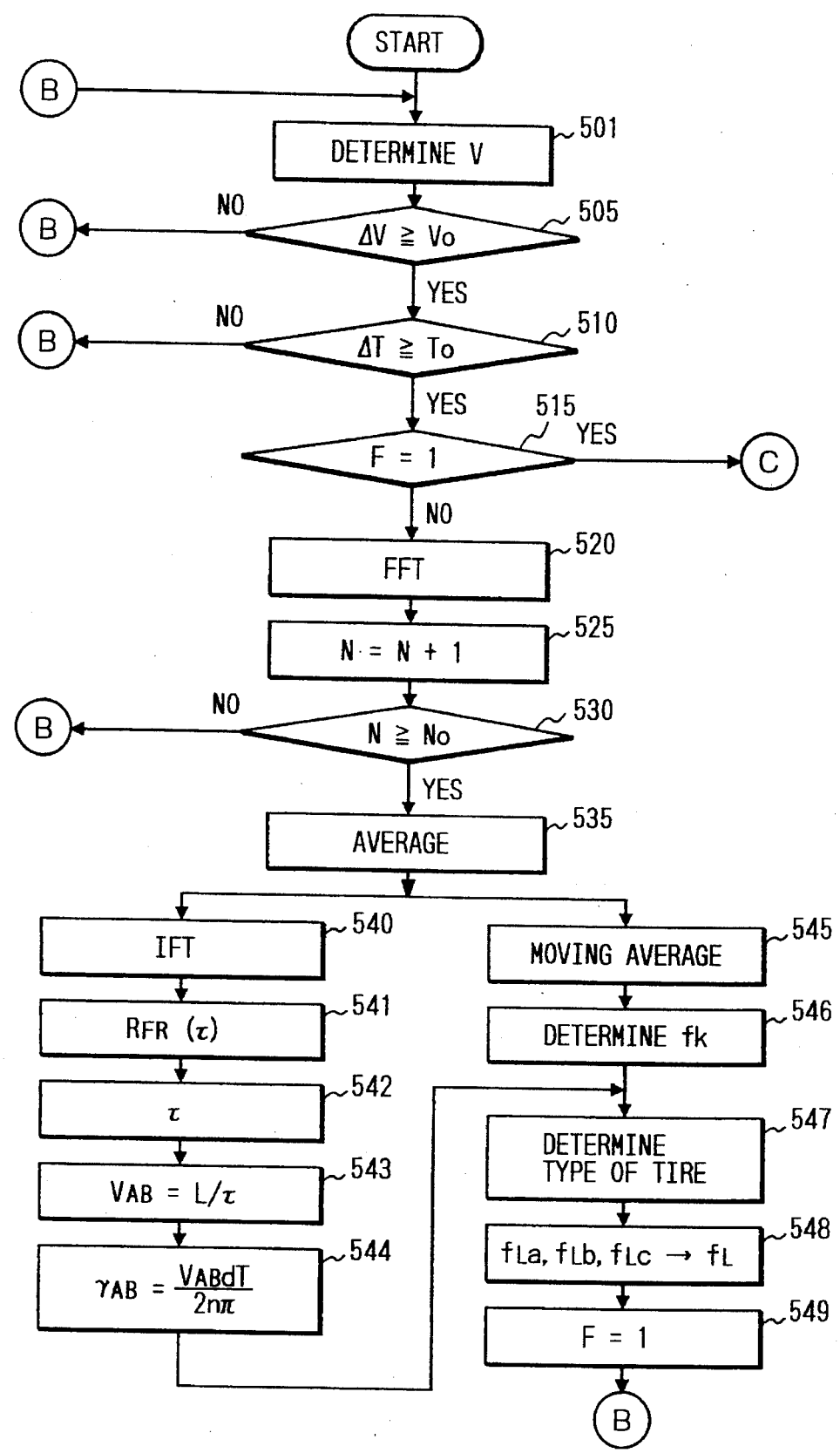
FIGS. 20 and 21 show a flowchart according to a fourth embodiment of a tire condition monitoring system of the invention.
Figure 21:
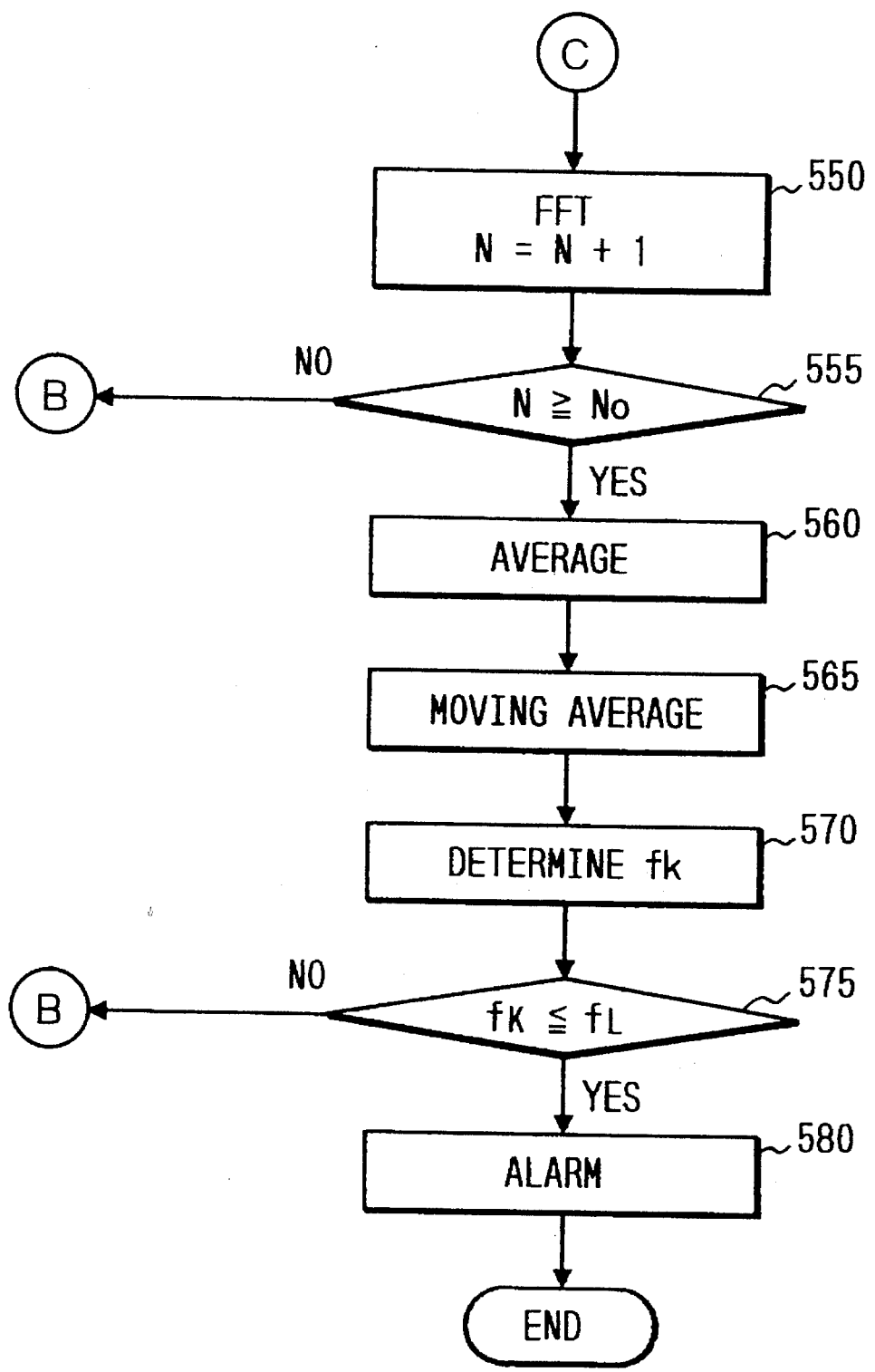

Referring to FIGS. 20 and 21, there is shown a flowchart of a program of logical steps performed by the ECU 4 of the tire condition monitoring system according to the fourth embodiment. This program is carried out for each tire.

Steps 501 to 535 are the same as steps 300 to 335, as shown in FIG. 14, and explanation thereof in detail will be omitted here.

Step 515 is provided for determining whether the type of tire has been already found or not. If a flag F indicates one, meaning that the type of tire has been already determined, then the routine proceeds to step 550, as will be described hereinafter.

Steps 540 to 544 are the same as steps 340 to 360, as shown in FIG. 14. The dynamic loaded fire radius $r_{AB}$ is determined based on the absolute vehicle speed $V_{AB}$.

Steps 545 and 546 are processed simultaneously with steps 540 to 544. In step 375, the moving average of the average of the FFT operation results is performed. In step 546, the resonance frequency fk is determined.

Subsequently, the routine proceeds to step 547 wherein the type of tire is determined based on the dynamic loaded tire radius $r_{AB}$ derived in step 544 and the unsprung resonance frequency fk derived in step 546 by looking up the map, as shown in FIG. 19. The routine then proceeds to step 548 wherein the allowable lower limit selected $P_0$ is selected from among fLa, fLb, and fLc based on the type of tire determined by look-up using the map, as shown in FIG. 18. The routine then proceeds to step 549 wherein the flag F is set to one. It should be noted that the determination of the type of tire is made only just after the vehicle is started. In practice, it is desirable that the allowable low limit $P_0$ be changed in step 548 only when all tires or tires of driven wheels are changed.

Once the type of tire is determined, the routine returns back to step 501. After a YES answer is obtained in both steps 505 and 510, in step 515, it is determined that the flag F shows one, and then routine proceeds to step 550.

In step 550, the fast Fourier transform (FFT) of frequency components of the wheel speed V is taken, and the number of operations of the FFT N is counted (N=N+1). Steps 501 to 550 are repeated until a preselected count value $N_O$ is reached.

In step 560, the FFT operation results are averaged. In step 565, the moving average of the average of the FFT operation results is performed. In step 546, the resonance frequency fk is determined based on the results in step 565.

Afterwards, the routine proceeds to step 575 wherein it is determined whether the unsprung resonance frequency fk is smaller than the allowable lower limit $P_O$ (i.e., fLa, fLb, or fLc) or not. If a YES answer is obtained, then the routine proceeds to step 580 wherein an alarm signal is provided through the display unit 5 to indicate that the tire is partially or completely deflated.

Figure 22:
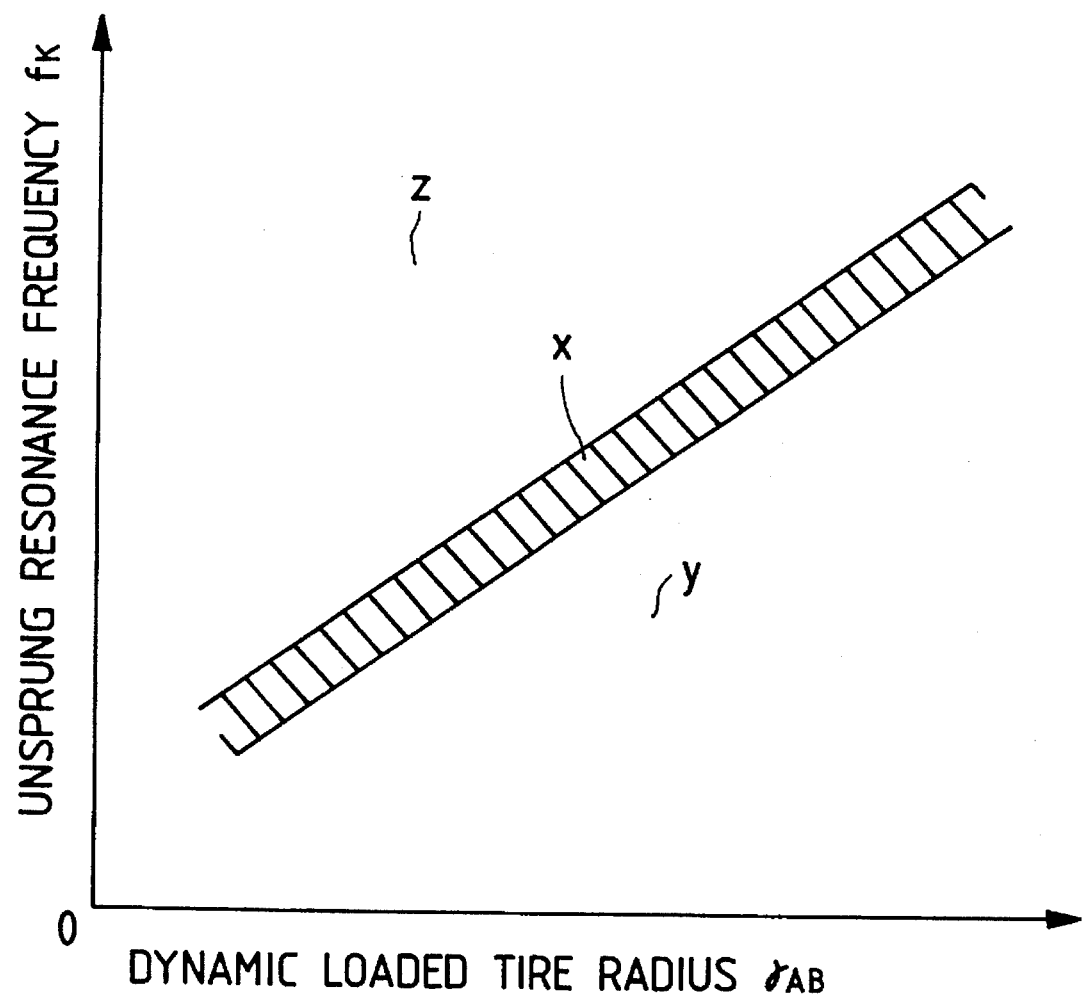
FIG. 22 is a graph which shows a relation between an unsprung resonance frequency and a dynamic loaded tire radius.

The determination of the type of tire may alternatively be performed by look-up using a map, as shown in FIG. 22. In this case, the type of tire is determined based on which regions X, Y, and Z the dynamic loaded tire radius $r_{AB}$ and the unsprung resonance frequency fk fall in.

Figures 23, 24:
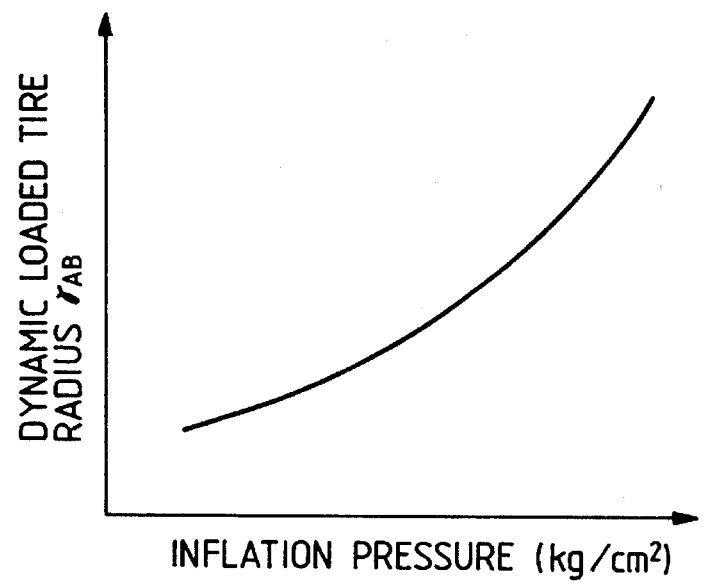
FIG. 23 is a map which shows the type of tire determined based on the relation between an unsprung resonance frequency and a dynamic loaded tire radius.
FIG. 24 is a graph which shows a relation between a dynamic loaded tire radius and a tire inflation pressure.

Additionally, the determination of the type of tire may be carried out by look-up using a map, as shown in FIG. 23. This map defines 3×3 matrix arrangement zones each indicating the type of tire. Based on deviations of the dynamic loaded tire radius $r_{AB}$ and the unsprung resonance frequency fk from those of a standard radial tire installed at the factory, the type of tire is determined.

It is found that in the case of a standard radial tire, the dynamic loaded tire radius $r_{AB}$ and the unsprung resonance frequency fk are simultaneously changed due to a variation in tire inflation pressure. This characteristic is shown in zones "a".

In the case of a studless snow tire, a rubber material used is usually soft, showing a decreased unsprung resonance frequency fk. This characteristic is shown in zone "b". Additionally, in the case of a lower aspect ratio tire, a spring constant is commonly lower than the standard radial fire, assuming an increased unsprung resonance frequency fk. This characteristic is shown in zones "c".

Hatched zones indicate rages wherein it is difficult to determine whether the type of tire attached is the standard radial tire or the others, however, it may be projected using the determination results of other tires in the following manner. Usually, there is almost no possibility that all four or two tires are simultaneously decreased or increased in inflation pressure due to causes other than the tire change, therefore, when such conditions are encountered, it may be determined that the tires have been changed. Accordingly, when the unsprung resonance frequencies fk and the dynamic loaded tire radii of all four or two tires are decreased at the same time, it is determined that the tires have been replaced with the studless snow tire. Conversely, when the unsprung resonance frequencies fk and the dynamic loaded tire radii of all four or two tires are simultaneously increased, it is determined that the tires have been replaced with the lower aspect ratio tire.

A fifth embodiment of the tire condition monitoring system will be described below. This embodiment is designed to measure the mount of tire wear based on the dynamic loaded tire radius $r_{AB}$ and the unsprung resonance frequency fk.

Usually, the resonance frequency of an unsprung portion do not change even when a tire has worn. Therefore, it should be noted that the mount of tire wear is detectable by finding a deviation of the dynamic loaded tire radius determined based on the unsprung resonance frequency from that when the vehicle is traveling straight under a normal condition where there is no tire wear.

Figure 25:
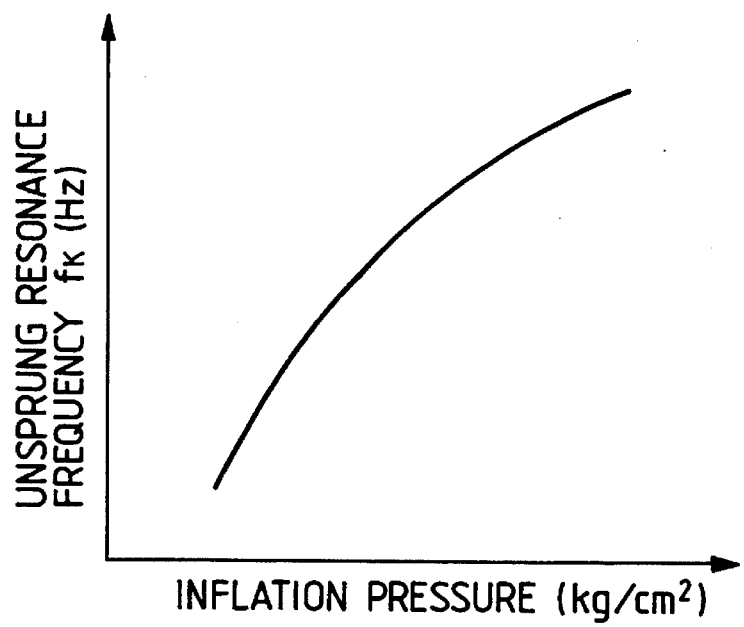
FIG. 25 is a graph which shows a relation between an unsprung resonance frequency and a tire inflation pressure.
Figure 26:
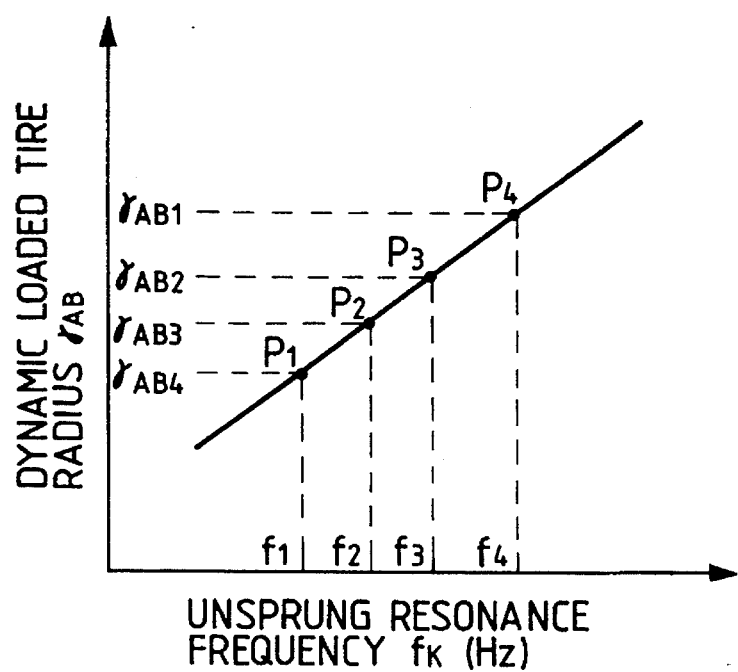
FIG. 26 is a graph which shows a relation between a dynamic loaded tire radius and an unsprung resonance frequency.

FIG. 24 shows the relation between the dynamic loaded tire radius $r_{AB}$ (m) calculated based on the absolute vehicle speed $V_{AB}$ and the tire inflation pressure (kg/cm$^2$). In addition, FIG. 25 shows the relation between the unsprung resonance frequency fk (Hz) and the tire inflation pressure (kg/cm$^2$). Based on these relations, as shown in FIGS. 24 and 25, the relation between the dynamic loaded tire radius $r_{AB}$ (m) and the unsprung resonance frequency fk (Hz), as shown in FIG. 26, may be found. FIG. 26 shows a change in the dynamic loaded tire radius $r_{AB}$ when only the tire inflation pressure is changed without tire wear under normal conditions of straight running for a given time period. When all four tires do not yet wear or otherwise have worn to substantially the same degree, a correlation between the unsprung resonance frequency fk of each tire (i.e., the tire inflation pressure) and the dynamic loaded tire pressure $r_{AB}$ is defined by a line extending through points $P_1$ to $P_4$. Note that $P_1$ shows a minimum tire inflation pressure, while $P_4$ indicates a maximum tire inflation pressure.

Figure 27:
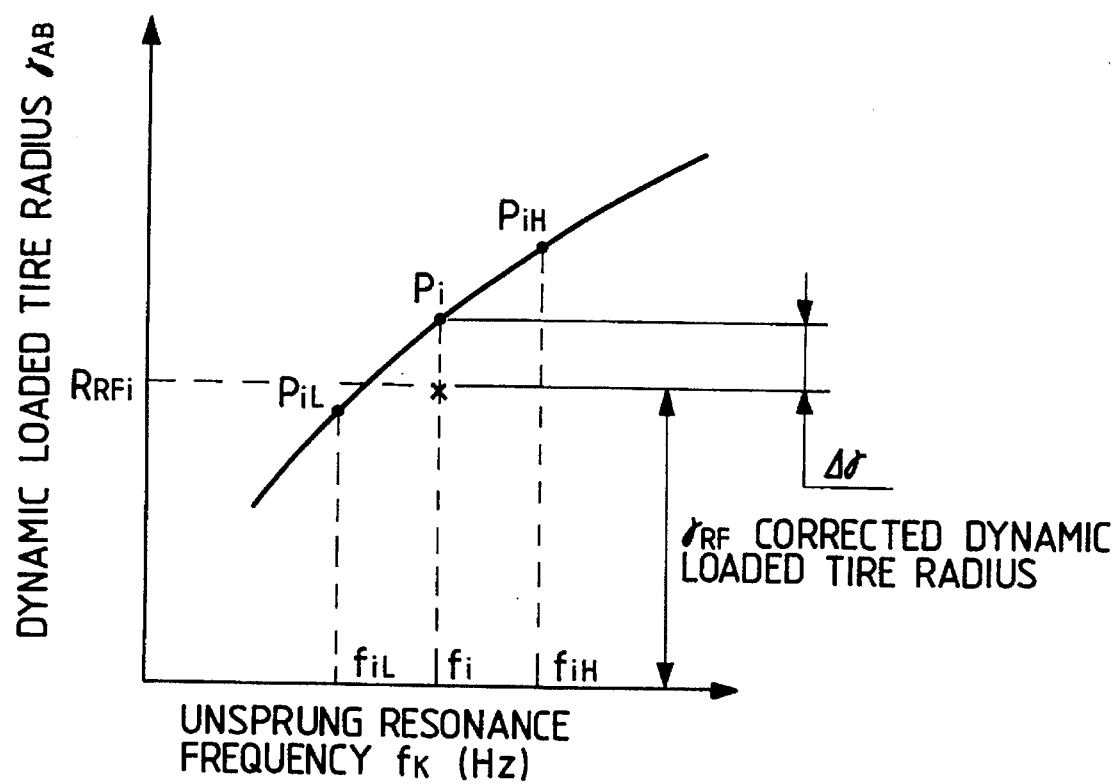
FIG. 27 is a graph which shows a change in relation between a dynamic loaded tire radius and an unsprung resonance frequency due to tire wear.

FIG. 27 shows the dynamic loaded tire radius $r_{AB}$ when the tire inflation pressure is Pi and the unsprung resonance frequency fk is fi under conditions of no wear. PiL shows the case where the tire inflation pressure drops, while PiH represents the case where the tire inflation pressure becomes higher than a regular level. In contrast, when the tire has worn while the tire inflation pressure remains Pi, the dynamic loaded tire radius $r_{AB}$ experiences a change Δr to $R_{RFi}$. It will be appreciated that the amount of tire wear may be determined by finding the change Δr of the dynamic loaded tire radius $r_{AB}$.

In practice, the phase difference τ between the front and rear wheels, as mentioned above, is derived and the dynamic loaded tire radius $r_{AB}$ is calculated based on the absolute vehicle speed $V_{AB}$ to determine the unsprung resonance frequency fk for projecting the amount of tire wear based on the change Δr of the dynamic loaded tire radius $r_{AB}$ by looking up the map, as shown in FIG. 27.

Figure 28:
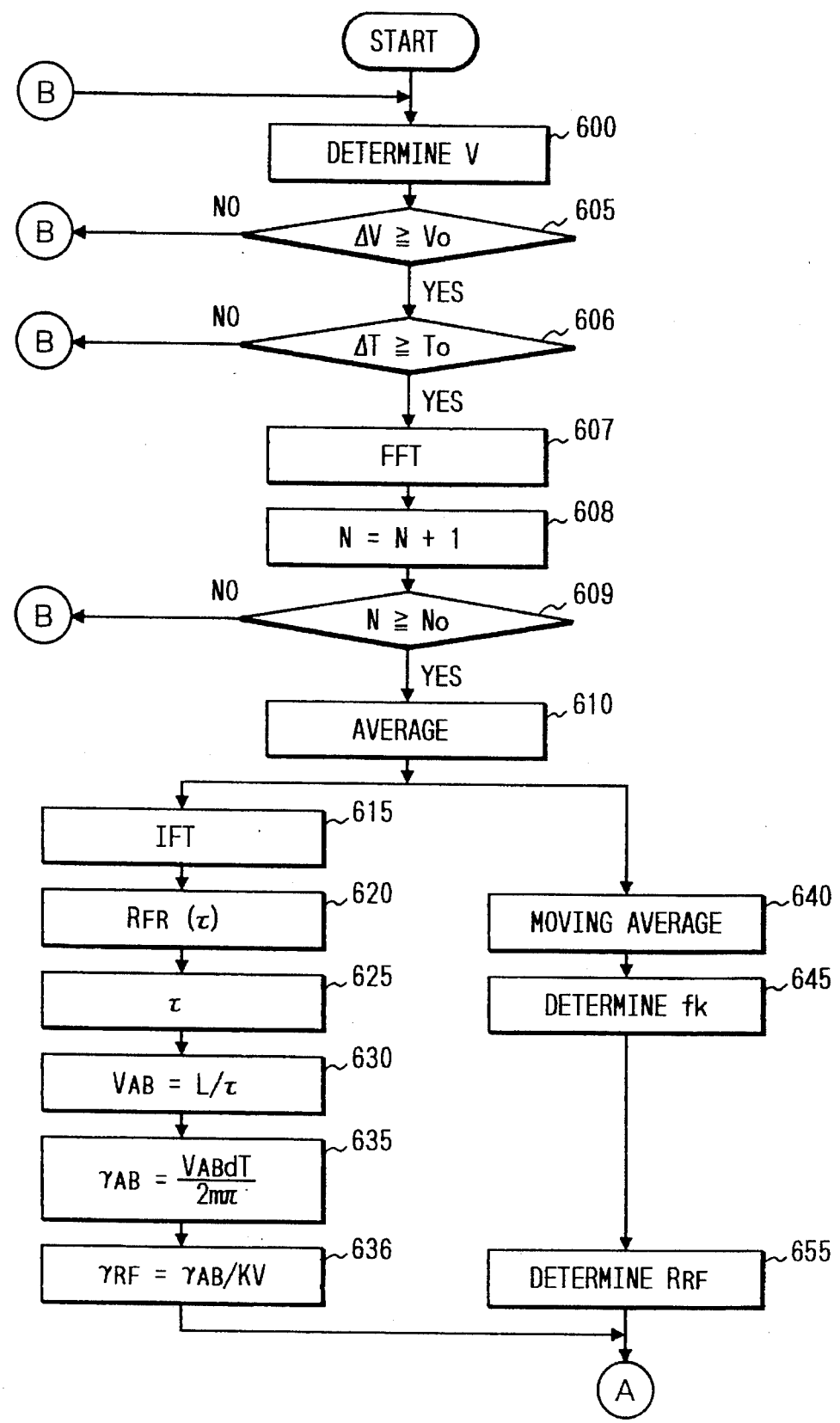
FIGS. 28 and 29 show a flowchart according to a fifth embodiment of a tire condition monitoring system of the invention.
Figure 29:
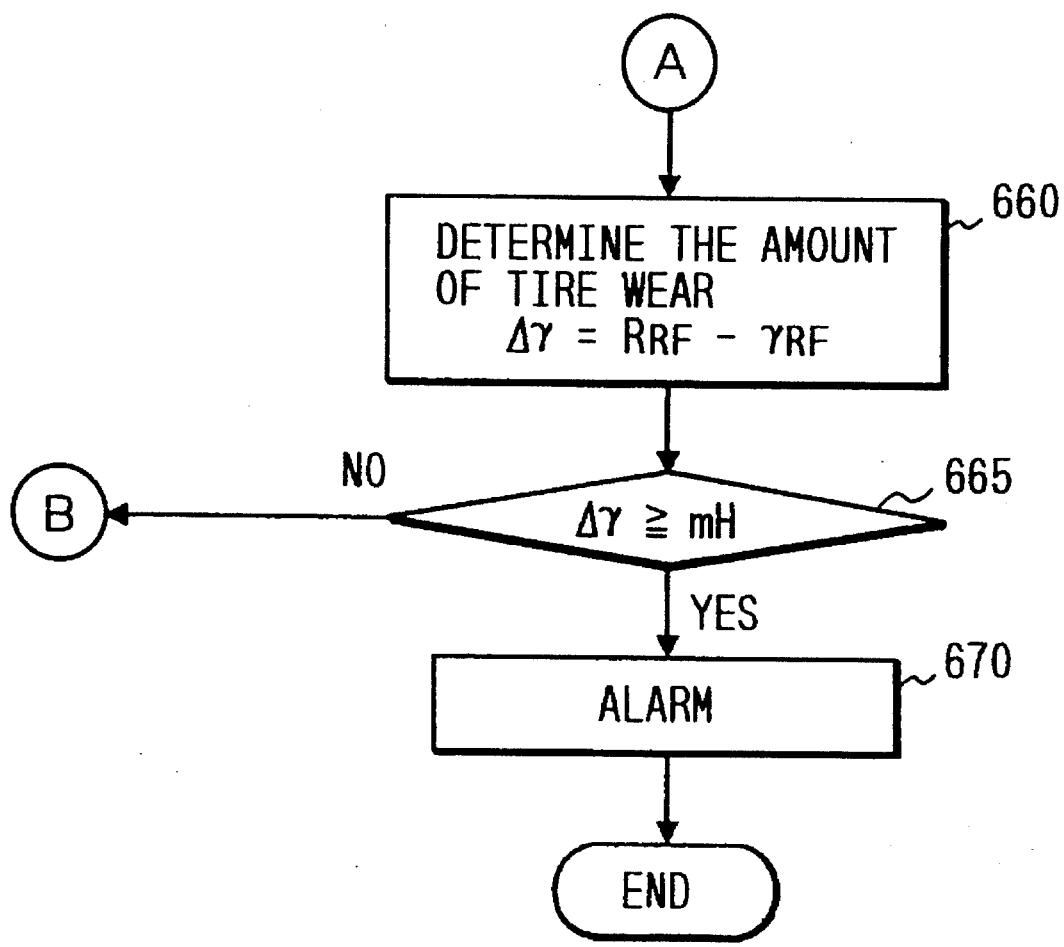

FIGS. 28 and 29 shows a flowchart of a program performed by the fifth embodiment of the tire condition monitoring system. This program is carried out for each tire. Steps 600 to 635 and steps 640 to 650 are the same as steps 300 to 360 and steps 375 to 380, as shown in FIG. 14, respectively and explanation thereof in detail will be omitted here.

In step 636, similar to step 265, as shown in FIG. 11, the correction factor Kv of the dynamic loaded tire radius $r_{AB}$ is determined based on the absolute vehicle speed $V_{AB}$ by looking up the map, as shown in FIG. 10, and a corrected dynamic loaded tire radius $r_{RF}$ is determined according to the relation of ($r_{AB}$/Kv) for eliminating the influence of vehicle speed. In step 655, a dynamic loaded tire radius $R_{RF}$ under normal conditions of no tire wear is determined based on the unsprung resonance frequency fk, as derived in step 545, by look-up using the map, as shown in FIG. 26, stored in the ECU 4.

Subsequently, the routine proceeds to step 660 wherein the amount of tire wear Δr (i.e., the change of the dynamic loaded tire radius $r_{AB}$) is found by subtracting the corrected dynamic loaded tire radius $r_{RF}$ from the dynamic loaded tire radius $R_{RF}$. The routine then proceeds to step 665 wherein it is determined whether the amount of tire wear Δr is greater than a given threshold value mH or not. If a YES answer is obtained, then the routine proceeds to step 670 wherein an alarm is raised to inform the driver that the tire has worn below a regular level.

Figure 30:
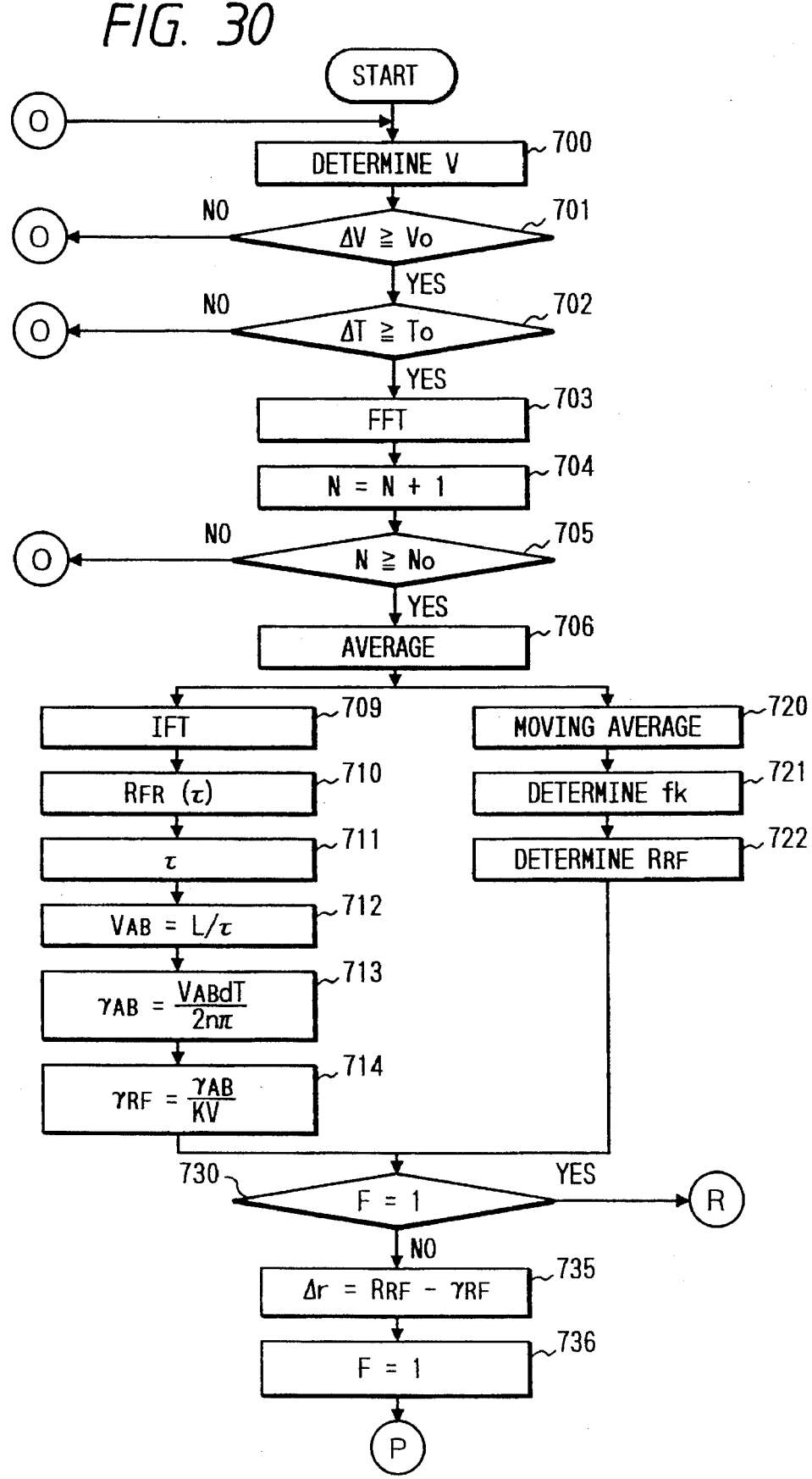
FIGS. 30 and 31 show a flowchart according to a sixth embodiment of a tire condition monitoring system of the invention.
Figure 31:
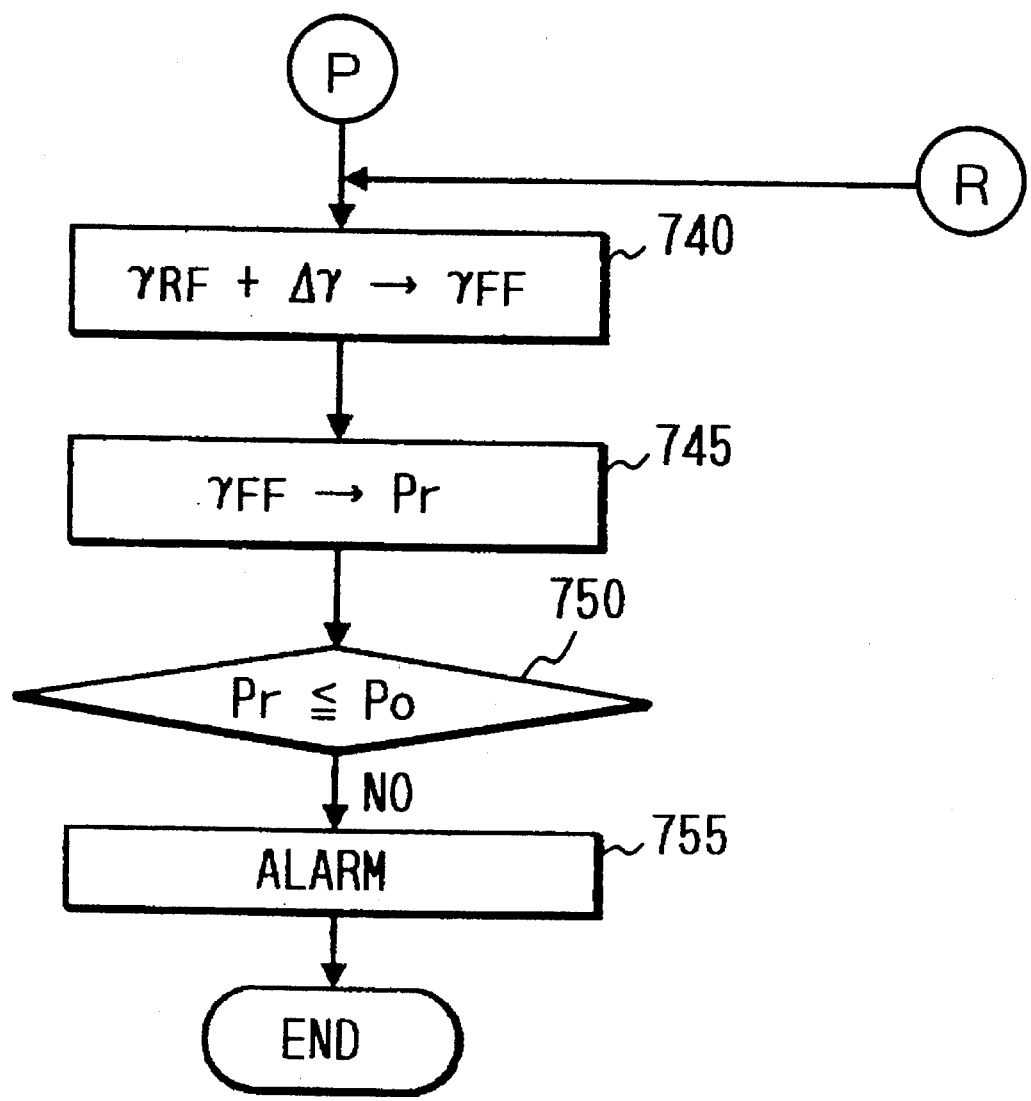

FIGS. 30 and 31 shows a sixth embodiment of the tire condition monitoring system. This embodiment is designed to correct the dynamic loaded tire radius $r_{AB}$ using the amount of tire wear projected based on the dynamic loaded tire radius and the unsprung resonance frequency to determine the tire inflation pressure with higher accuracy. Steps 700 to 714 and steps 720 to 721 are the same as steps 300 to 365 and 375 to 380, as shown in FIG. 11, respectively and explanation thereof in detail will be omitted here.

In step 722, in a similar manner to step 655, the dynamic loaded tire radius $R_{RF}$ under normal conditions of no tire wear is determined based on the unsprung resonance frequency fk, as derived in step 721.

After steps 714 and 722, the routine proceeds to step 730 wherein it is determined whether a flag F is one or not. If a NO answer is obtained, then the routine proceeds to step 735 wherein the amount of tire wear Δr is found by subtracting the corrected dynamic loaded tire radius $r_{RF}$ from the dynamic loaded tire radius $R_{RF}$. Once the amount of tire wear Δr is determined after the vehicle has been started, the flag F is set to one in step 736. This is because since the tire usually does not wear extremely while the vehicle is traveling, the determination of the amount of tire wear, as long as it is made once after the vehicle has been started, may be considered as being adequate. In addition, the determination of the amount of tire wear is not always needed just after the vehicle starts or an ignition switch is turned on, it may be made every several times.

If a YES answer is obtained in step 730 or after step 736, the routine proceeds to step 740 wherein the corrected dynamic loaded tire radius $r_{RF}$, as derived in step 714, is further corrected by adding the amount of tire wear Δr to determine a new corrected dynamic loaded tire radius $r_{FF}$. The routine then proceeds to step 745 wherein the tire inflation pressure Pr is determined based on the corrected dynamic loaded tire radius $r_{FF}$ by look-up using the map, as shown in FIG. 9. The routine proceeds to step 750 wherein it is determined whether the tire inflation pressure Pr is smaller than a given threshold value $P_O$ or not. If a YES answer is obtained, the routine then proceeds to step 755 wherein an alarm is raised to inform the driver that the tire has deflated partially or completely.

The tire condition monitoring system of the invention, as stated above, is able to determine the tire inflation pressure, the type of tire, or the mount of tire wear. It is thus, possible to use this tire condition monitoring system with systems such as an ABS, a TCS (traction control system) or a 4 WS (four-wheel steering system). In the case of the ABS, a reference value for controlling a braking pressure can be corrected according to the type of tire, thereby initiating braking control with proper timing, resulting in the efficiency of the braking control being improved further.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments .and modification to the shown embodiments which can be embodied without departing from the principle of the invention as set forth in the appended claims.

What is claimed is:

1. A system for projecting the absolute speed of a vehicle comprising:

first detecting means for detecting a wheel speed of a front wheel to provide a front wheel speed indicative signal including at least one of unsprung vertical and longitudinal vibration frequency components caused by vibration inputs acting on the front wheel from a road surface;

second detecting means for detecting a wheel speed of a rear wheel to provide a rear wheel speed indicative signal including at least one of unsprung vertical and longitudinal vibration frequency components caused by vibration inputs acting on the rear wheel from the road surface;

phase difference determining means, responsive to the signals from said first and second detecting means, for determining a phase difference in said at least one of unsprung vertical and longitudinal vibration frequency components between said first and second detecting means to provide a signal indicative thereof; and vehicle speed projecting means, responsive to the signal from said phase difference determining means, for projecting the absolute speed of the vehicle based on the phase difference and the wheel base of the vehicle.

2. A system for monitoring tire conditions of a vehicle comprising:

first detecting means for detecting an unsprung vibration frequency component acting on a front wheel to provide a signal indicative thereof;

second detecting means for detecting an unsprung vibration frequency component acting on a rear wheel to provide a signal indicative thereof;

phase difference determining means, responsive to the signals from said first and second detecting means, for determining a phase difference between the unsprung vibration frequency components acting on the front and rear wheels to provide a signal indicative thereof;

vehicle speed projecting means, responsive to the signal from said phase difference determining means, for projecting an absolute speed of the vehicle based on the phase difference and the wheel base of the vehicle;

wheel speed determining means for determining a wheel speed; and tire condition determining means for determining a change in tire radius during traveling based on the wheel speed determined by said wheel speed determining means and the absolute speed of the vehicle projected by said vehicle speed projecting means.

3. A system as set forth in claim 2, wherein said tire condition determining means determines a dynamic loaded tire radius based on the wheel speed determined by said wheel speed determining means and the absolute speed of the vehicle projected by said vehicle speed projecting means to measure a tire inflation pressure.

4. A system as set forth in claim 3, wherein said tire condition determining means raises an alarm to a driver when the tire inflation pressure is less than a given threshold value.

5. A system as set forth in claim 2, further comprising unsprung resonance frequency determining means for determining an unsprung resonance frequency of each wheel, said tire condition determining means determines a first tire inflation pressure based on the wheel speed determined by said wheel speed determining means and the absolute speed of the vehicle projected by said vehicle speed projecting means rand a second tire inflation pressure based on the unsprung resonance frequency determined by said unsprung resonance frequency determining means, said tire condition determining means concluding that there is a change in tire inflation pressure when a difference between the first and second tire inflation pressures is less than a given value and at least one of the first and second tire inflation pressure is smaller than a given threshold value.

6. A system as set forth in claim 5, further comprising unsprung resonance frequency determining means for determining an unsprung resonance frequency of each wheel, said tire condition determining means determines a first tire inflation pressure based on the wheel speed determined by said wheel speed determining means and the absolute speed of the vehicle projected by said vehicle speed projecting means and a second tire inflation pressure based on the unsprung resonance frequency determined by said unsprung resonance frequency determining means, said tire condition determining means concluding that there is a change in tire inflation pressure based on the first tire inflation pressure when the wheel speed determined by said wheel speed determining means lies out of a given range and based on the second tire inflation pressure when the wheel speed falls within the given range.

7. A system as set forth in claim 5, wherein said vehicle speed projecting means projects first and second absolute speeds of the vehicle based on the phase differences between right front and rear wheels and left front and rear wheels and the wheel base of the vehicle, when a difference between the first and second absolute speeds is less than a given value, said tire condition determining means concluding that there is the change in tire inflation pressure.

8. A system as set forth in claim 6, wherein said tire condition determining means concludes that there is the change in tire inflation pressure based on the second tire inflation pressure when the wheel speed falls within the given range and a variation in the wheel speed is greater than a preselected value.

9. A system for monitoring tire conditions of a vehicle comprising:

first detecting means for detecting an unsprung vibration frequency component acting on a front wheel to provide a signal indicative thereof;

second detecting means for detecting an unsprung vibration frequency component acting on a rear wheel to provide a signal indicative thereof;

phase difference determining means, responsive to the signals from said first and second detecting means, for determining a phase difference between the unsprung vibration frequency components acting on the front and rear wheels to provide a signal indicative thereof;

vehicle speed projecting means, responsive to the signal from said phase difference determining means, for projecting an absolute speed of the vehicle based on the phase difference and the wheel base of the vehicle;

wheel speed determining means for determining a wheel speed;

unsprung resonance frequency determining means for determining an unsprung resonance frequency; and tire condition determining means for determining a dynamic loaded tire radius based on the wheel speed determined by said wheel speed determining means and the absolute speed of the vehicle projected by said vehicle speed projecting means, wherein said tire condition determining means includes tire type specifying means for specifying a type of tire used on the vehicle based on the dynamic loaded tire radius and the unsprung resonance frequency.

10. A system as set forth in claim 9, wherein said tire condition determining means measures a tire inflation pressure in a preselected relation to the dynamic loaded tire radius, said tire condition determining means providing an alarm signal when the tire inflation pressure becomes lower than a preselected level.

11. A system for monitoring tire conditions of a vehicle comprising:

first detecting means for detecting an unsprung vibration frequency component acting on a front wheel to provide a signal indicative thereof;

second detecting means for detecting an unsprung vibration frequency component acting on a rear wheel to provide a signal indicative thereof;

phase difference determining means, responsive to the signals from said first and second detecting means, for determining a phase difference between the unsprung vibration frequency components acting on the front and rear wheels to provide a signal indicative thereof;

vehicle speed projecting means, responsive to the signal from said phase difference determining means, for projecting an absolute speed of the vehicle based on the phase difference and the wheel base of the vehicle;

wheel speed determining means for determining a wheel speed;

unsprung resonance frequency determining means for determining an unsprung resonance frequency; and tire condition determining means for determining a first dynamic loaded tire radius of a tire showing a preselected amount of tire wear based on the unsprung resonance frequency and a second dynamic loaded tire radius based on the wheel speed determined by said wheel speed determining means and the absolute speed of the vehicle projected by said vehicle speed projecting means, said tire condition determining means finding a difference between the first and second dynamic loaded tire radii to determine an amount of tire wear.

12. A system as set forth in claim 11, wherein said tire condition determining means corrects the first dynamic loaded tire radius by the mount of tire wear to derive a corrected dynamic loaded tire radius, said tire condition determining means measuring a tire inflation pressure in a preselected relation to the corrected dynamic loaded tire radius, said tire condition determining means providing an alarm signal when the tire inflation pressure becomes lower than a preselected level.

13. A system for projecting the absolute speed of a vehicle comprising:

first detecting means for detecting a wheel speed of a front wheel to provide a front wheel speed indicative signal including at least one of unsprung vertical and longitudinal resonance frequencies due to vibration inputs acting on the front wheel from a road surface;

second detecting means for detecting a wheel speed of a rear wheel to provide a rear wheel speed indicative signal including at least one of unsprung vertical and longitudinal resonance frequencies due to vibration inputs acting on the rear wheel from the road surface;

phase difference determining means, responsive to the signals from said first and second detecting means, for determining a phase difference in said at least one of unsprung vertical and longitudinal resonance frequencies between the front wheel speed indicative signal and the rear wheel speed indicative signal; and vehicle speed projecting means, responsive to the signal from said phase difference determining means, for projecting the absolute speed of the vehicle based on the phase difference and the wheel base of the vehicle.

14. A system as set forth in claim 13, wherein said phase difference determining means determines the phase difference when a variation in the at least one of the unsprung vertical and longitudinal resonance frequencies included in the front and rear wheel speed indicative signals is greater than a given frequency value and time during which the at least one of the unsprung vertical and longitudinal resonance frequencies exceeds the given frequency value, is greater than a given period of time.

15. A system for projecting the absolute speed of a vehicle comprising:

first detecting means for detecting a wheel speed of a front wheel to provide a front wheel speed indicative signal including at least one of unsprung vertical and longitudinal vibration frequency components caused by vibration inputs acting on the front wheel from a road surface;

second detecting means for detecting a wheel speed of a rear wheel to provide a rear wheel speed indicative signal including at least one of unsprung vertical and longitudinal vibration frequency components caused by vibration inputs acting on the rear wheel from the road surface;

phase difference determining means, responsive to the signals from said first and second detecting means, for determining a phase difference in said at least one of unsprung vertical and longitudinal vibration frequency components between said first and second detecting means to provide a signal indicative thereof, said phase difference determining means determining a first time a maximum value of the unsprung vibration frequency components acting on the front wheel is generated and a second time a maximum value of the unsprung vibration frequency components acting on the rear wheel is generated, said phase difference determining means finding a difference between the first and second times to determine said phase difference; and vehicle speed projecting means, responsive to the signal from said phase difference determining means, for projecting the absolute speed of the vehicle based on the phase difference and the wheel base of the vehicle.

16. A system as set forth in claim 15, wherein said phase difference determining means determines the first and second times when ratios of the maximum values of the unsprung vibration frequency components acting on the front and rear wheels within a preselected unsprung vibration frequency component sampling time period is greater than a given value, respectively.

17. A system for projecting the absolute speed of a vehicle comprising:

first detecting means for detecting a wheel speed of a front wheel to provide a front wheel speed indicative signal including unsprung vibration frequency components caused by vibration inputs acting on the front wheel from a road surface;

second detecting means for detecting a wheel speed of a rear wheel to provide a rear wheel speed indicative signal including unsprung vibration frequency components caused by vibration inputs acting on the rear wheel from the road surface;

phase difference determining means, responsive to the signals from said first and second detecting means, for determining a phase difference in said unsprung vibration frequency components between said first and second detecting means to provide a signal indicative thereof; and vehicle speed projecting means, responsive to the signal from said phase difference determining means, for projecting the absolute speed of the vehicle based on the phase difference and the wheel base of the vehicle.

* * * * *